US009489641B2

(12) United States Patent
Brown et al.

(10) Patent No.: US 9,489,641 B2
(45) Date of Patent: Nov. 8, 2016

(54) CONDITION MONITORING SYSTEM

(75) Inventors: Adam Brown, Glasgow (GB); Stephen McArthur, Glasgow (GB)

(73) Assignee: University of Strathclyde, Glasgow (GB)

(*) Notice: Subject to any disclaimer, the term of this patent is extended or adjusted under 35 U.S.C. 154(b) by 0 days.

(21) Appl. No.: 13/500,696

(22) PCT Filed: Oct. 14, 2010

(86) PCT No.: PCT/GB2010/001914
§ 371 (c)(1),
(2), (4) Date: Jul. 23, 2012

(87) PCT Pub. No.: WO2011/045571
PCT Pub. Date: Apr. 21, 2011

(65) Prior Publication Data
US 2012/0284291 A1 Nov. 8, 2012

(30) Foreign Application Priority Data
Oct. 14, 2009 (GB) .................................. 0918038.1

(51) Int. Cl.
*G06F 17/30* (2006.01)
*G06Q 10/00* (2012.01)

(52) U.S. Cl.
CPC ......... *G06Q 10/00* (2013.01); *G06F 17/30702* (2013.01); *G06F 17/30867* (2013.01)

(58) Field of Classification Search
USPC .............................. 707/756; 706/12; 717/102
See application file for complete search history.

(56) References Cited

U.S. PATENT DOCUMENTS

| 6,505,246 | B1 | 1/2003 | Land et al. |
| 7,398,471 | B1 | 7/2008 | Rambacher et al. |
| 8,131,718 | B2 * | 3/2012 | Tran .................. G06F 17/30867 707/732 |
| 2003/0126258 | A1 | 7/2003 | Conkright et al. |
| 2004/0225955 | A1 | 11/2004 | Ly |
| 2005/0235249 | A1 * | 10/2005 | Friemelt et al. .............. 717/102 |
| 2008/0082464 | A1 | 4/2008 | Ozzie et al. |
| 2009/0077055 | A1 * | 3/2009 | Dillon et al. ..................... 707/5 |
| 2009/0117921 | A1 | 5/2009 | Beydler et al. |

(Continued)

FOREIGN PATENT DOCUMENTS

| CN | 1570875 A | 1/2005 |
| EP | 1 967 923 A2 | 9/2008 |

(Continued)

OTHER PUBLICATIONS

Search Report from British Application No. GB0918038.1, dated Feb. 12, 2010.

(Continued)

*Primary Examiner* — Sherief Badawi
*Assistant Examiner* — Christopher J Raab
(74) *Attorney, Agent, or Firm* — Alston & Bird LLP

(57) ABSTRACT

A computer based conditioning monitoring system for monitoring at least one condition data source. The system is adapted to determine condition data of interest to a user and build a user profile based on the condition data of interest. As and when new condition data sources are added, the system is adapted to identify these and automatically access or make available condition information from the existing data sources and any newly added condition data source. Relevant data in any of the available the condition data sources is identified and presented to the user based on the user profile.

18 Claims, 30 Drawing Sheets

(56) References Cited

U.S. PATENT DOCUMENTS

| | | | |
|---|---|---|---|
| 2010/0063976 A1* | 3/2010 | Bertin et al. | 707/769 |
| 2011/0208739 A1* | 8/2011 | Weissman | 707/737 |
| 2013/0124549 A1* | 5/2013 | King et al. | 707/758 |

FOREIGN PATENT DOCUMENTS

| | | |
|---|---|---|
| EP | 2 198 354 A1 | 6/2010 |
| GB | 2 420 205 A | 5/2006 |
| GB | 2 430 339 A | 3/2007 |
| WO | WO 2004/102378 A2 | 11/2004 |
| WO | WO 2009/038947 A1 | 3/2009 |

OTHER PUBLICATIONS

International Search Report from International Application No. PCT/GB2010/001914, mailed Jan. 19, 2011.

Combined Search and Examination Report from British Application No. GB1017389.6, dated Feb. 14, 2011.

MacArthur S D J et al.; "Multi-Agent Systems for Power Engineering Applications—Part I: Concepts, Approaches, and Technical Challenges"; IEEE Transactions on Power Systems, IEEE Service Center, Piscataway, NJ, US, vol. 22, No. 4, Nov. 1, 2007 (Nov. 1, 2007), pp. 1743-1752, XP011194235.

MacArthur S D J et al.; "Multi-Agent Systems for Power Engineering Applications—Part II: Technologies, Standards, and Tools for Building Multi-Agent Systems"; IEEE Transactions on Power Systems, IEEE Service Center, Piscataway, NJ, US, vol. 22, No. 4, Nov. 1, 2007 (Nov. 1, 2007), pp. 1753-1759, XP011194236.

Christina B Vilakazi, et al.; "Agents and Multi-Agent Systems and Application to Condition Monitoring"; Systems, Man and Cybernetics, 2007, ISIC. IEEE International Conference on, IEEE, Oct. 1, 2007 (Oct. 1, 2007), pp. 644-649, XP031198431.

Jahn G, et al.; "The Design of a Multi-Agent Transformer Condition Monitoring System"; IEEE Transactions on Power Systems, IEEE Service Center, Piscataway, NJ, US, vol. 19, No. 4, Nov. 1, 2004 (Nov. 1, 2004), pp. 1845-1852, XP011121273.

Jinjiang Zhang, et al.; "Studies on Layered Condition Monitoring Information Platform Based on Multi-Agent Technology"; Condition Monitoring and Diagnosis, 2008, CMD 2008, International Conference on IEEE, Piscataway, NJ, US, Apr. 21, 2008 (Apr. 21, 2008), pp. 1338-1341, XP031292731.

Catterson, Victoria, et al.; "Managing Remote Online Partial Discharge Data"; IEEE Transactions on Power Delivery, vol. 23, No. 4, Oct. 2008, pp. 1754-1762.

Davidson, Euan, et al.; "Applying Multi-Agent System Technology in Practice: Automated Management and Analysis of SCADA and Digital Fault Recorder Data"; IEEE Transactions on Power Systems, vol. 21, No. 2, May 2006, pp. 559-567.

McArthur, Stephen, et al.; "Automated Post-Fault Diagnosis of Power System Disturbances"; IEEE PES PSACE Panel Paper—General Meeting 2006, pp. 1-6.

* cited by examiner

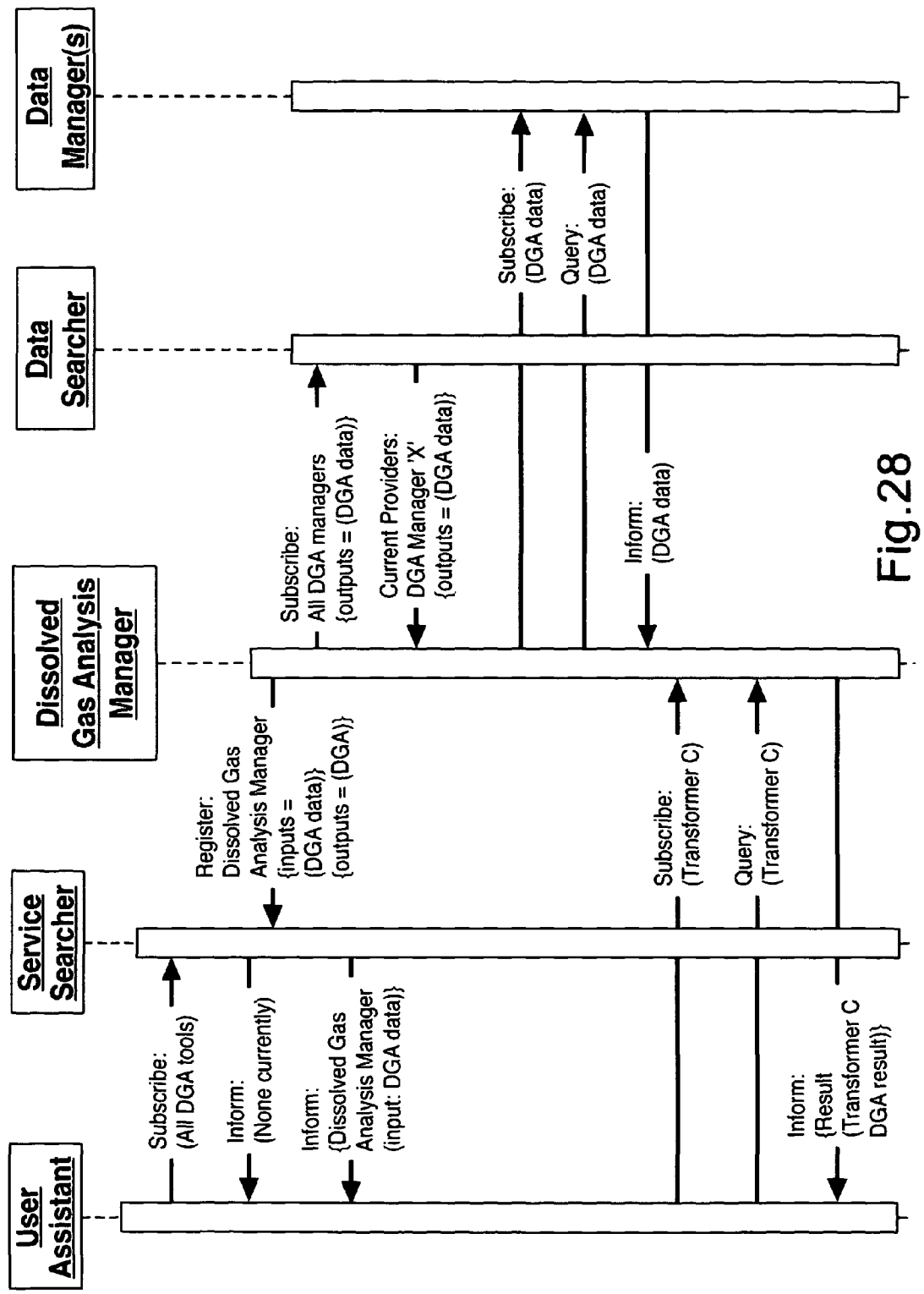

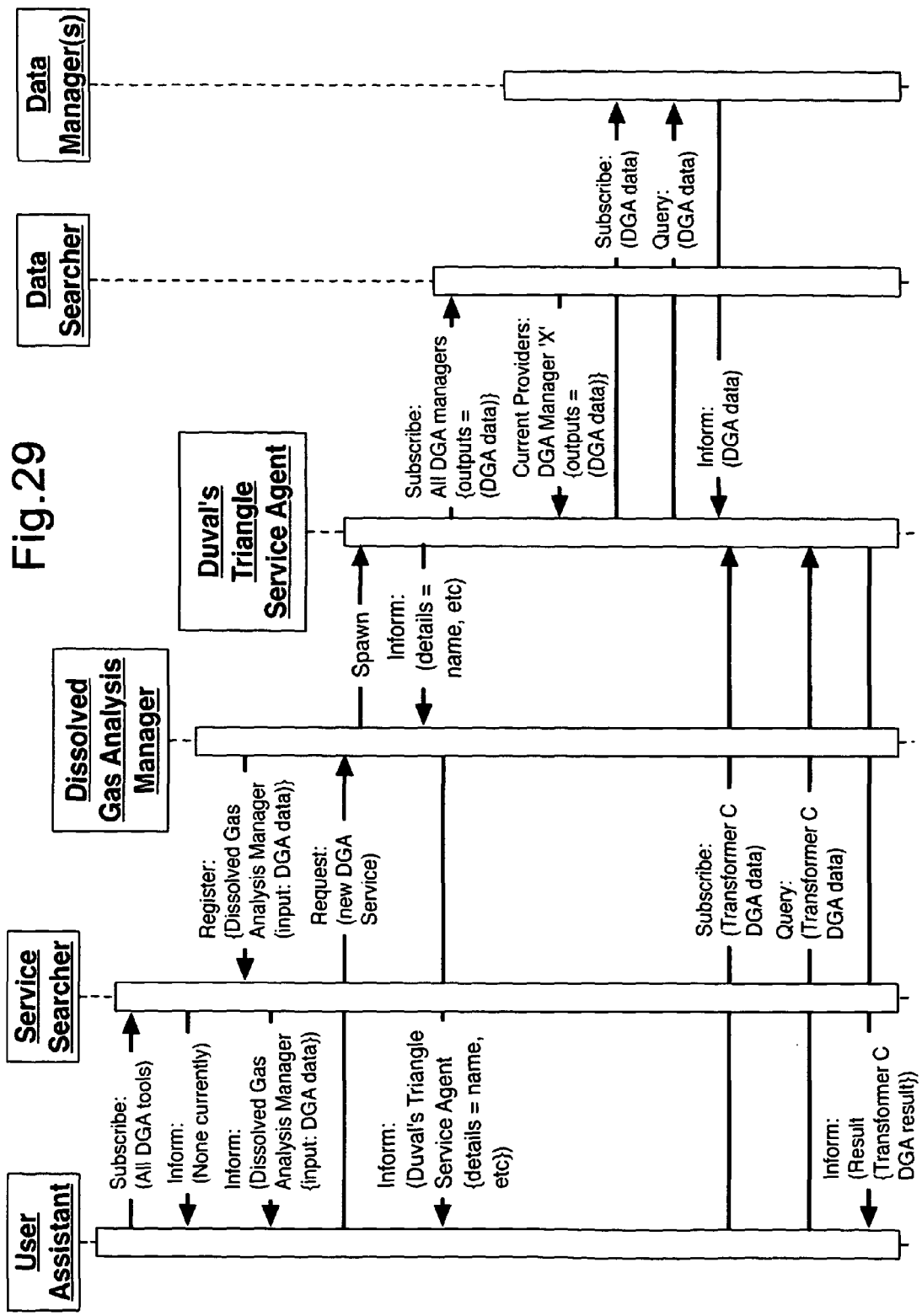

CONDITION MONITORING SYSTEM

FIELD OF THE INVENTION

The present invention relates to a condition monitoring system and in particular an agent based condition-monitoring system.

BACKGROUND OF THE INVENTION

Condition monitoring of plant equipment is important for safely prolonging the life of costly assets. Attempts to monitor the condition of important assets through the interpretation of pertinent sensor measurements have been made within a number of industries. The various sensors and systems designed for this normally produce large volumes of data, all of which must be analysed to make it useful for decision support. Each system typically provides access to its data via a separate bespoke user interface, making it difficult to utilise generic, modular tools capable of automatic data interpretation. Manual analysis is therefore commonplace, requiring skilled personnel to investigate substantial quantities of data from numerous sources.

As a consequence of the need for manual intervention, it is often impossible for data to be monitored in real-time as intended. In addition, data analysis personnel tend to naturally gravitate towards the sole use of certain favoured data sources. This results in large quantities of valuable data being regularly directed to databases for rudimentary storage, thus producing huge, unconnected and unused data silos. Furthermore, these databases may also contain manually entered information, such as maintenance records, which can provide histories, and therefore context, of equipment under scrutiny. Data volume and organisation currently reduce the likelihood of comparison and inference between related data sources, which can provide important insight into the operation of overall systems.

WO 2004/102378 describes an intelligent information dashboard system for collecting, managing, and presenting data and information to allow decision making from real-time information based on data from a number of sources. This system has three functional layers: a top layer, which is a software application, for designing and displaying the information; a middle layer, which is a data management layer for data propagation and aggregation and a bottom layer, the intelligent dashboard agent, for data collecting and processing data. In one example, the top layer of the intelligent information dashboard system is a web-based dashboard module for presentation of the information collected by intelligent dashboard agents and managed by a dashboard management layer. Whilst the system of WO 2004/102378 can provide useful functionality it is limited in that the dashboards presented to the user are pre-set at design time. There is limited flexibility from the user's point of view.

SUMMARY OF THE INVENTION

According to the present invention, there is provided a computer based conditioning monitoring system for monitoring a system that has at least one condition data source, the computer based conditioning monitoring system being adapted to: determine condition data of interest to a user; build a user profile based on the condition data of interest; identify the addition of one or more condition data sources to the system being monitored; access or make available sensed condition information from the at least one condition data source and any added condition data source, and use the user profile to present relevant data to the user, so that relevant data from the at least one condition data source and any added condition data source is presented to the user.

By allowing a user to determine a user profile, the invention provides a dynamic user configurable condition monitoring system that can be readily tailored to a user's own specific needs, through the use of reasoning which can connect data, analytics and users.

At least one data analysis function may be provided for applying to condition sensing data, wherein the relevant data presented to the user is the output of any one or more of the functions available. Each data analysis function includes knowledge of the type of condition data needed to perform its function, and the system is adapted to: match one or more data analysis functions with one or more users by matching condition data of interest in a user profile with available data needed by the data analysis function and present to a user an option to select one or more matched data analysis functions or the outputs of the one or more matched data analysis functions.

By automatically matching users and data functions, based on the user profile, the system allows newly added analysis tools to be made available to a user, without the user having to do anything and in particular without a user having to initiate a search.

A user assistant may be configured to determine data of interest to a user by presenting to the user a plurality of user selectable options based on data available via at least one data manager, and receiving one or more user selections. The user assistant may be adapted to present a plurality of options to a user, each option being associated with a plurality of more specific related options. Each option may be associated with the plurality of more specific related options based on an "is-a" relationship. Options may be determined through the user reasoning unit employing knowledge of the profile, ontology and other modules in the system. Options may be presented in a number of formats including, but not limited to, on-screen dialogs, wizards and expandable trees.

User assistants host the configurable, proactive interface that allows end users to interact with the overall system. In order to communicate successfully with the user, terms must be translated between the system ontology and user-understandable concepts and vice versa. To this end, the user assistant may comprise a user translator for translating a request for information into a form appropriate for the user and vice versa. This user translator, over time, may adapt itself to learn user preferred terms and so further adapt the interface to its individual user.

The user assistant is preferably adapted to up-date the user profile in response to receipt of information on a new user interest. This means that the system can handle changes in user needs over time.

A plurality of data managers may be provided. Each data manager may be associated with a specific site or area or data source that is being monitored. Data managers are not limited by any particular OEM equipment, but may be associated with any type of data source. Each data manager may be responsible for accessing one or more data sources, such as databases, web services, spreadsheets, on-site sensors, etc., and making data available to the overall system. The data sources may contain any data required within the overall system, including that which is gathered directly from sensor measurement and that which is input manually, perhaps following maintenance or inspection. To achieve this, they must translate data labels from the language of the data source to the commonly understood system ontology. The data manager may comprise a data translator for translating a request for information into a form appropriate for the data source and for translating information from the data source into a form suitable for other agents within the system.

The data manager may include a translator for translating information received from the data source into a form interpretable by the computer based system and translating information received from the computer based system into a form interpretable by the data source.

The system may comprise at least one service manager handing a service for analysing data captured by the data manager, wherein the user assistant is adapted to present the functionality of the at least one service manager to the user as a selectable option. The service managers access data from the data managers and expose it to a form of analysis or interpretation, which could range from simple statistical analysis to advanced artificial intelligence-based interpretation. The service managers have the ability to self-determine the data required to perform their analysis task and so, by examining the data made available by the data managers, know when they are eligible for use. This self-determination may be achieved through a service reasoning unit employing knowledge of the service requirements, ontology and other modules in the system. The system may exploit this ability to offer relevant analysis tools to users when they are available. The service managers provide a standard software interface meaning that the available range of analyses may be extended by customers, third parties or a service provider.

According to another aspect of the invention, there is provided a computer based conditioning monitoring system for monitoring at least one condition data source, wherein the system has one or more data analysis functions, each function including knowledge of the type of condition data needed to perform its function, the computer based conditioning monitoring system being adapted to: determine condition data of interest to a user; build a user profile based on the condition data of interest; access or make available condition information from the at least one condition data source and any added condition data source; automatically match one or more data analysis functions with one or more users by matching condition data of interest in the user profile with available data needed by the data analysis function and present to a user an option to select one or more matched data analysis functions or the outputs of the one or more matched data analysis functions.

In one embodiment, the present invention provides a computer based conditioning monitoring system comprising a plurality of intelligent agents including at least one user agent adapted to interact with a user and at least one data agent adapted to access or make available condition data from at least one sensor that is sensing conditions at one or more sites, wherein the user agent is configured to determine data of interest to a user; build a user profile based on the data of interest and use that user profile to present relevant data to the user.

The user agent may be configured to determine data of interest to a user by presenting to the user a plurality of user selectable options based on data available via the at least one data agent, and receiving one or more user selections. The user agent may be adapted to present a plurality of high level options to a user, each option being associated with a plurality of related, more specific options, wherein on selection of one of the high level options the other more specific options are presented. The plurality of more specific options may be related to the associated higher level option based on an "is-a" relationship. The user agent may be adapted to up-date the user profile in response to receipt of information on a new user interest.

The data agent may be adapted to register its identity and the type of information it has available to it. The data agent may be adapted to cause its registration to be up-dated in the event that further information becomes available to it.

At least one analysis agent may be provided for analysing data captured by the data agent, wherein the user agent is adapted to present the functionality of the at least one analysis agent to the user as a selectable option. Each analysis agent may be adapted to register its identity and the type of analysis it can perform.

The at least one user agent may include a translator for translating information received from the user into a form interpretable by the computer based system and translating information received from the computer based system into a form interpretable by the user.

The at least one data agent includes a translator for translating information received from the data source into a form interpretable by the computer based system and translating information received from the computer based system into a form interpretable by the source. A plurality of data agents may be provided.

The above system may be implemented using a number of technology approaches, including but not limited to multi-agent systems and web services. The remainder of this document will describe a multi-agent system-based implementation approach; however, those skilled in the art will understand that other approaches are equally applicable.

BRIEF DESCRIPTION OF THE DRAWINGS

Various aspects of the invention will be described by way of example only with reference to the accompanying drawings, of which:

FIG. 28 is a flow diagram representing interactions that may occur when a new service manager providing information of interest to a user joins the system;

FIG. 29 is a flow diagram representing alternative interactions that may occur when a new service manager providing information of interest to a user joins the system.

DETAILED DESCRIPTION OF THE DRAWINGS

Figure 1:
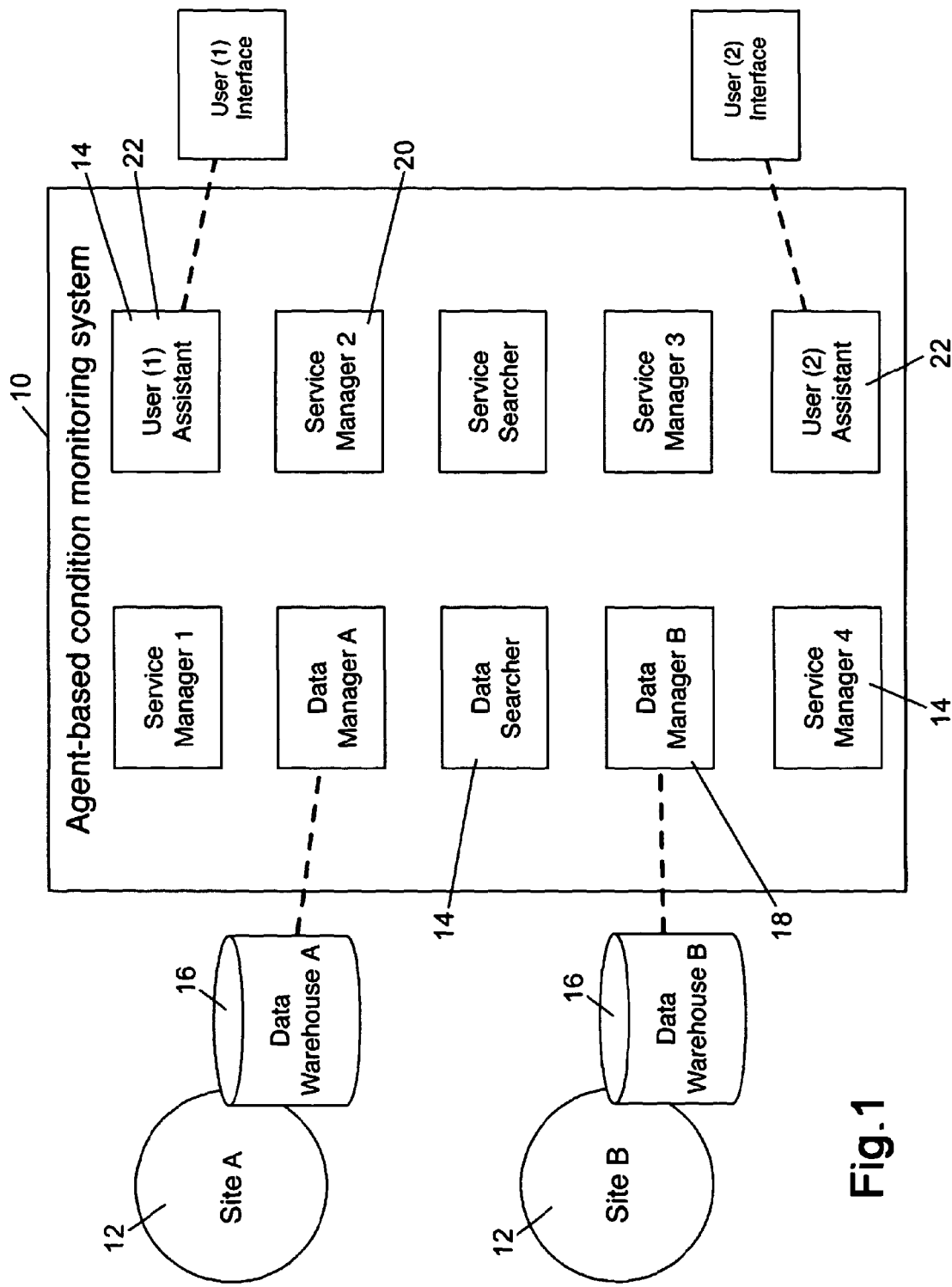
FIG. 1 is a block diagram of an agent-based condition monitoring system.

The present invention relates to a computer-based condition monitoring system capable of individual user configurability and proactive user assistance. The system is adapted to determine condition data of interest to a user and build a user profile based on the condition data of interest. As and when new condition data sources are added, the system is adapted to identify these and automatically access or make available condition information from the existing data sources and any newly added condition data source. Relevant data in any of the available the condition data sources is identified and presented to the user based on the user profile. The system may include analysis functions that are made available to the user depending on the user profile, as and when analysis functions become available. In this way, the invention provides a platform that allows flexible and dynamic access to potentially large amounts of data and analysis tools, including data and tools that may not have been present when the user registered with the system initially.

The overall system comprises a collection of software modules resident on a computer-based system. A multi-agent system-based implementation approach will be described; however, those skilled in the art will understand that other approaches are equally applicable. As used herein, the term "agent" refers without limitation to an intelligent agent, as defined below. Each agent contains differing functionality whilst providing a standardised interface to the rest of the system. Alongside this standardised interface, agents also provide functionality to search for and request the information supplied by other agents within the system.

Intelligent agents are software entities that reside in an environment that may describe physical surroundings, which can be discerned via sensors, but commonly can be thought of simply as the agent's knowledge of the overall system in which it resides. Each intelligent agent has its own particular set of goals, which it aims to achieve. Therefore, whilst multi-agent systems may be designed with a certain overall objective in mind, their behaviour relies on and emerges from the individual performance of their particular agents. An intelligent agent has three characteristics: reactivity, pro-activity and social ability.

Reactivity means that the agent must be able to react to changes in its environment. When these occur, it should be able to schedule appropriate actions, which allow it to continue to fulfil its goals in light of the alterations. Proactivity refers to an intelligent agent's ability to work towards achievement of its goals without the requirement for external prompting. It alludes to the agent's competence to seek out solutions when problems occur, perhaps by contacting other agents for assistance. Social ability means that intelligent agents are capable of interaction with other intelligent agents.

This interaction provides intelligent agents with the ability to call upon other intelligent agents for information or services essential for their goal attainment.

Intelligent agents are often used to encapsulate or interface to software responsible for a specific task or goal. They are useful in this regard as they can provide a standard interface between software functionality. As such, software systems can be designed in terms of their functional blocks. In addition, they are fundamentally extensible, as new functionality need only be wrapped within a new agent, which is then deployed within the system. Along with these benefits, agent systems are inherently flexible. The manner in which multi-agent systems carry out their overall remit is not explicitly stated. Instead, agents are designed to carry out precise tasks required to achieve intended overall system operation.

Agents are normally launched within an agent platform. While this may refer to the entire physical infrastructure on which agents are deployed (such as machines, operating systems, etc), the term is generally used to reference low level support software which provides underlying functionality for the creation and management of agents and for agent communication. Two options exist when using agent platforms to deploy agents (these are not mutually exclusive and may be applied together when setting up a large system). A single platform can be run on each networked machine. To agents launched on this platform, it is as if all agents are running in the same location even if they are launched onto the platform from different machines. In another example, a number of platforms can be used and informed of each other via for example network or web addresses. Agent platforms are available commercially or may be developed in-house.

Various standards have been agreed for intelligent agent platforms, for example Foundation for Intelligent Physical Agents (FIPA) standard specifications. To conform to this standard, a platform must contain a single Agent Management System (AMS) agent. The AMS manages basic platform housekeeping; for instance, it handles the creation and deletion of agents from the platform, and stores the names and physical addresses of existing agents so that they may be contacted. A platform may also provide a method of searching the overall system for existing services. FIPA-based platforms provide this in the form of a Directory Facilitator (DF) agent. Agents, when created, first inform the DF of the services they can provide. The DF holds these records and, henceforth, provides a directory service to the platform, i.e. agents can search the DF for particular services and be informed of other agents that can fulfil their requirements.

In the case of large systems which apply multiple platforms: each platform contains an AMS and, if they are being utilised, a DF. The AMS agents are responsible solely for managing the agents within their platform. DF agents can be instructed to not only search within their own platform, but also to search the DFs of other sibling platforms. Therefore, it is straightforward to find services (i.e. data and information) within large distributed systems extending across large physical distances.

In order for agents to be able to communicate effectively, they must be able to speak the same language. This language is made up of two parts: its structure or syntax, and the meaning of its content. Again, FIPA standards exist which may or may not be applied to define the syntax of agent language. FIPA defines the Agent Communication Language (ACL), which sets the structure of agent messages, and several communicative acts which define the conversation flows which should result between agents depending on the type of initial message being sent; e.g. an agent should respond slightly differently when being requested to perform a service, to provide data or when simply being informed of some information.

For the sake of convenience, and for the purposes of describing a specific embodiment of the invention, a FIPA based platform will be described. However, a skilled person will appreciate that other platforms could be used. The use of a DF will not be referred to from this point on; instead, a Data Searcher and Service Searcher are introduced. These roles may be provided by the existing DF, by separate generic functional blocks, or by software modules specific to each implementation. Again, the specifics of this implementation decision do not affect the core concepts described.

FIG. 1 shows an agent-based condition monitoring system 10 that resides between a site 12 generating real, live data that has to be monitored and a user interface. Every agent 14 within the system is able to act autonomously. Data from the site 12 is stored in one or more data warehouses 16 that are accessible by the system 10. This data can be collected directly by sensors from machines or physical hardware or any other condition dependent data sources, or input manually, perhaps following maintenance or inspection. Included in the condition monitoring system 10 are three classes of agents. These are data managers 18, service managers 20 handling analysis and interpretation functionality and user assistants 22.

Data managers 18 connect to databases/data acquisition systems to capture or access data that has to be analysed and are not limited by type or manufacturer of data source. Typically, one data manager 18 is provided for each data warehouse 16, although multiple data managers 18 could be provided depending on the system requirements. Data managers 18 are responsible for translating the gathered data into a form which can be understood by other agents within the system and have a standard interface through which data can be requested making the monitoring data easily available to the system. Furthermore, data managers 18 may be used to insert data back into data warehouses 16. For example, users may wish to add comments concerning particular events, or work orders detailing maintenance activities to be scheduled for particular items of equipment. Alongside extracting data, these data managers 18 may also provide this "write-back" functionality.

Service managers 20 provide analysis functionality that may be applied to relevant data made available by the data managers 18. Each service manager 20 is likely to provide a single analysis procedure ranging from a simple statistical analysis to an advanced form of artificial intelligence based interpretation. The agents' provision of a standard interface means that the available range of analyses can be easily extended by the service provider, customers or third parties.

Service managers 20 may provide any required data analysis or interpretation. For instance, data visualisation, anomaly detection, expert knowledge-based fault diagnosis, classification-based fault diagnosis, etc. Other more specific examples could include a Phase-Resolved Plot Generating Manager, a Statistical Anomaly Detection Manager, an Expert System-based Transformer Fault Diagnosis Manager and a Decision Tree-based Circuit Breaker Fault Diagnosis Manager.

User assistants provide the interface between end-users and the rest of the system, so that monitored data or information can be presented on the user interface. Typically, each user interface is associated with a single user assistant.

Together, data managers 18 and service managers 20 provide an open platform to access any form of data and analyse it with any type of software-based technique. All resulting information may subsequently be found and accessed via a user assistant.

When an agent is created, it may register its services with the Data Searcher or Service Searcher. Data managers 18, for instance, may advertise with the Data Searcher that they can provide certain types of measurement relating to a particular type of equipment. Service managers 20 may advertise with the Service Searcher that they can provide trending or fast Fourier transforms of data. The searchers note all these abilities and provide search services to the overall system.

Whilst classes of agent have particular roles within the system, no layered functional hierarchy is present. Instead ad-hoc teams of agents are formed dynamically, in real time, to generate customised data analysis for individual end-users.

All agents within the system perform a similar procedure when they are required to carry out their various tasks. The user assistants have to interact with the user to determine the information needed. In contrast, the data managers 18 and service managers 20 know in advance exactly the type of information required in order to fulfil their goals. Consider, for example, a service manager 20 that provides knowledge-based diagnosis of vibration signatures. When this is initially created, it may contact the Service Searcher and register that it can provide diagnosis of vibration data. The Service Searcher may also periodically seek out new service managers 20 to query them as to the service that they provide. If a service manager 20 is ever subsequently asked to provide its service, it may first query the Data Searcher for sources of vibration data and then contact them directly to receive the data required. Alternatively, the service manager 20 may be informed of the exact data that it is to analyse when its functionality is requested allowing it to immediately contact the relevant data manager 18. Service managers 20 may themselves undertake the analysis functionality that they support, or may spawn new service agents wholly responsible for providing the service. Spawning new service agents in this way may allow individual users to have their own dedicated service agents.

It should also be noted that whilst the services discussed herein primarily take inputs of data and output information to the user, this need not be the case. Service managers 20 may also receive inputs from users. For instance, engineers responsible for data analysis may update a Maintenance Work Scheduler Manager with required maintenance tasks; the manager would then inform other users wishing to know information about work required.

For interaction to occur between agents, a commonly understood ontology, i.e. a standard data dictionary/language, is required. The ontology specifies a set of concepts and the relationships that exist between them. There exist two main types of relationship within the system ontology: an inheritance or is-a relationships and association relationships. These will be described in turn.

Figure 2:
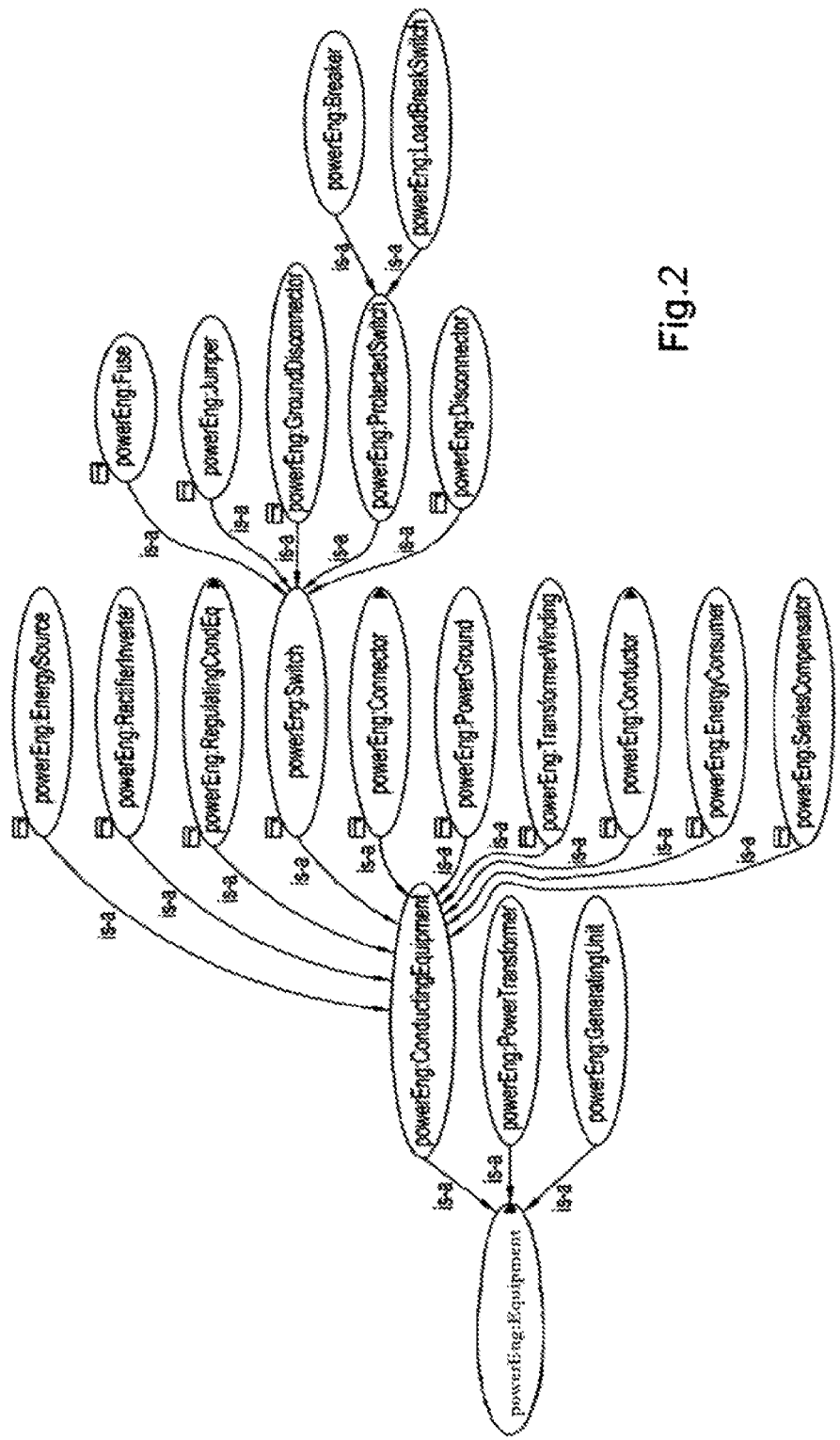
FIG. 2 illustrates a first inheritance relationship tree.
Figure 3:
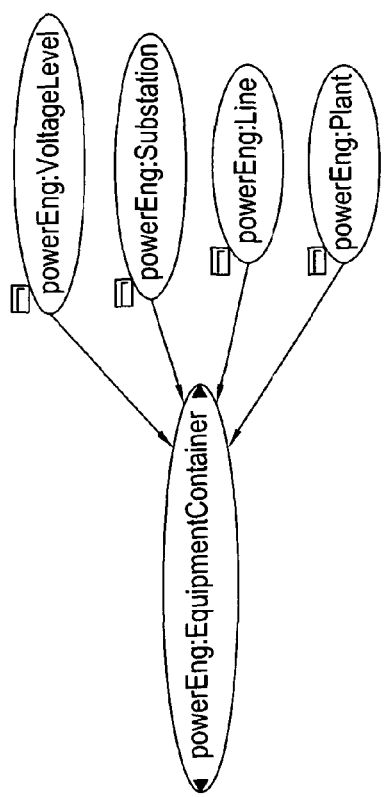
FIG. 3 illustrates a second inheritance relationship tree.
Figure 4:
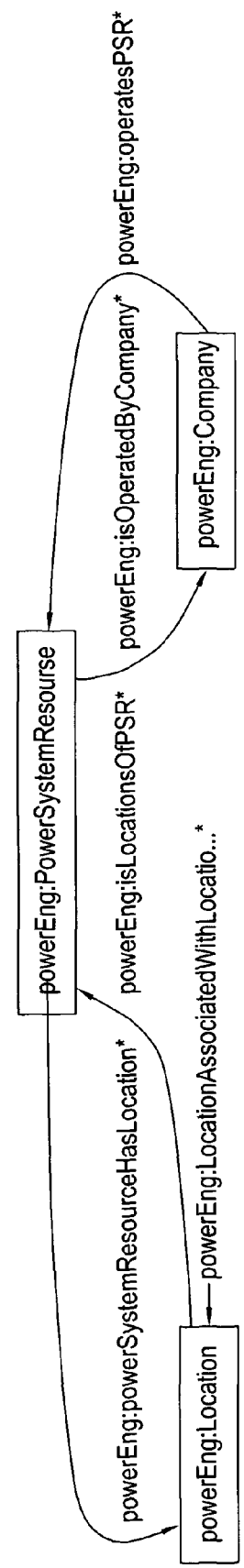
FIG. 4 illustrates a third inheritance relationship tree.
Figure 5:
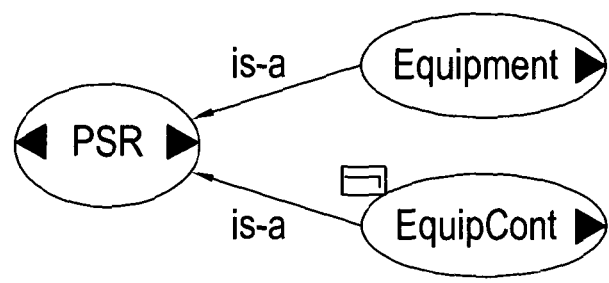
FIG. 5 illustrates a fourth inheritance relationship tree.

Inheritance or is-a relationships exist between high-level concepts and lower-level, more specialised concepts. The lower-level concepts inherit properties from the higher-level concepts (and can be said to be examples of them) but may also have additional properties that make them more specific. To provide a few simple examples, consider FIG. 2. In this case, within the ontology there is a concept "equipment". Underlying this are various specialised forms of equipment; for example conducting equipment, generating unit and power transformer. Some of these, in the case shown, conducting equipment, specialise further and so on until only specific concepts are found. Another concept, "equipment container", can be further specialised to define the concepts, for example, voltage level, substation, line, and plant, as shown in FIG. 3. It is possible that concepts inherit from more than one so-called ancestor concept. For instance, an ambient temperature measurement can be thought of as both a weather measurement and a temperature measurement, as shown in FIG. 4. Likewise, a transformer temperature measurement could be both a temperature measurement and a transformer measurement. Equally, both equipment and equipment container could inherit from the concept power system resource PSR, as shown in FIG. 5.

Figure 6:
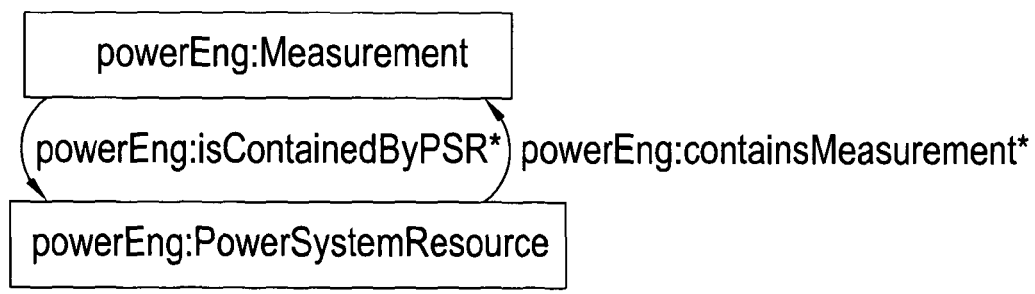
FIG. 6 illustrates a first association relationship linking associated concepts.
Figure 7:
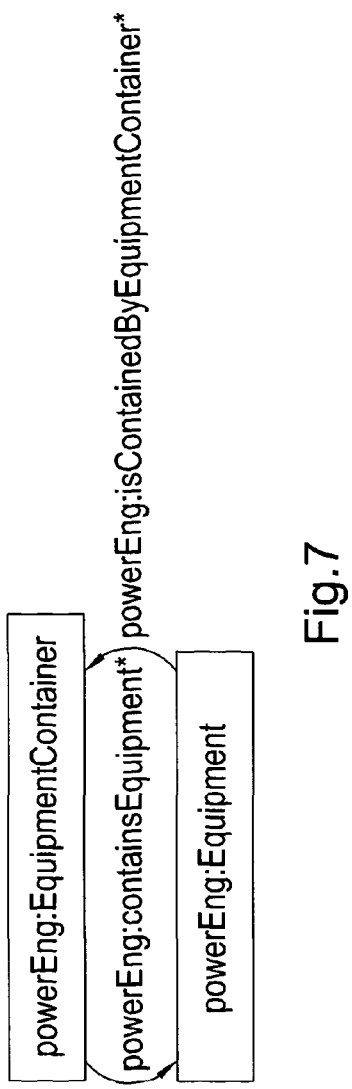
FIG. 7 illustrates a second association relationship linking associated concepts.
Figure 8:
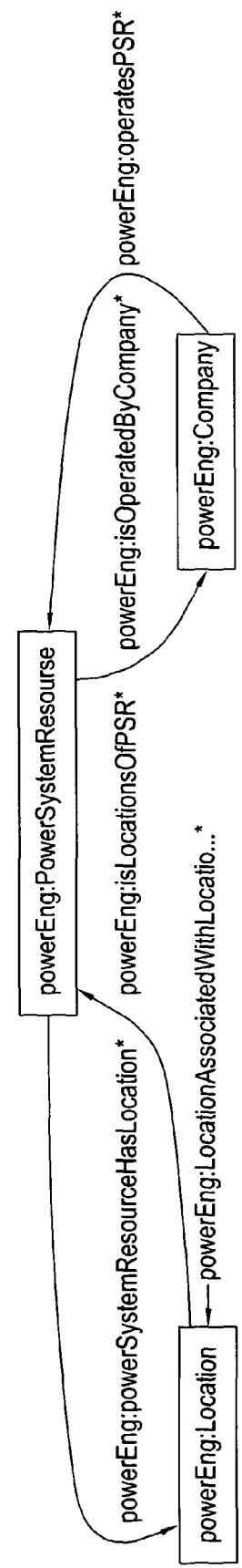
FIG. 8 illustrates a third association relationship linking associated concepts.

Association relationships define links between concepts. For example, a measurement may be linked to the particular power system resource from which it is taken and vice versa, see FIG. 6; an item of equipment will be contained by an equipment container and said equipment container will contain that item of equipment, see FIG. 7; a power system resource is operated by a particular company and situated at a particular location, see FIG. 8.

The relationships within the ontology provide a route to determining user interests. By first requesting that users define their interests at a high level, they can be helped to narrow their interests by referring to known concepts.

The system ontology is enforced in each agent in a data translation module. This is responsible for the translation of terms found in data warehouses 16 to their equivalent expressions in the system's ontology and vice versa. This translation makes it possible both to supply data stored in a range of formats to all agents within the system and to send queries retrieved from agents, with no knowledge of correct data format, to data warehouses 16. Each agent and its data translation module will now be described in more detail.

Figure 9:
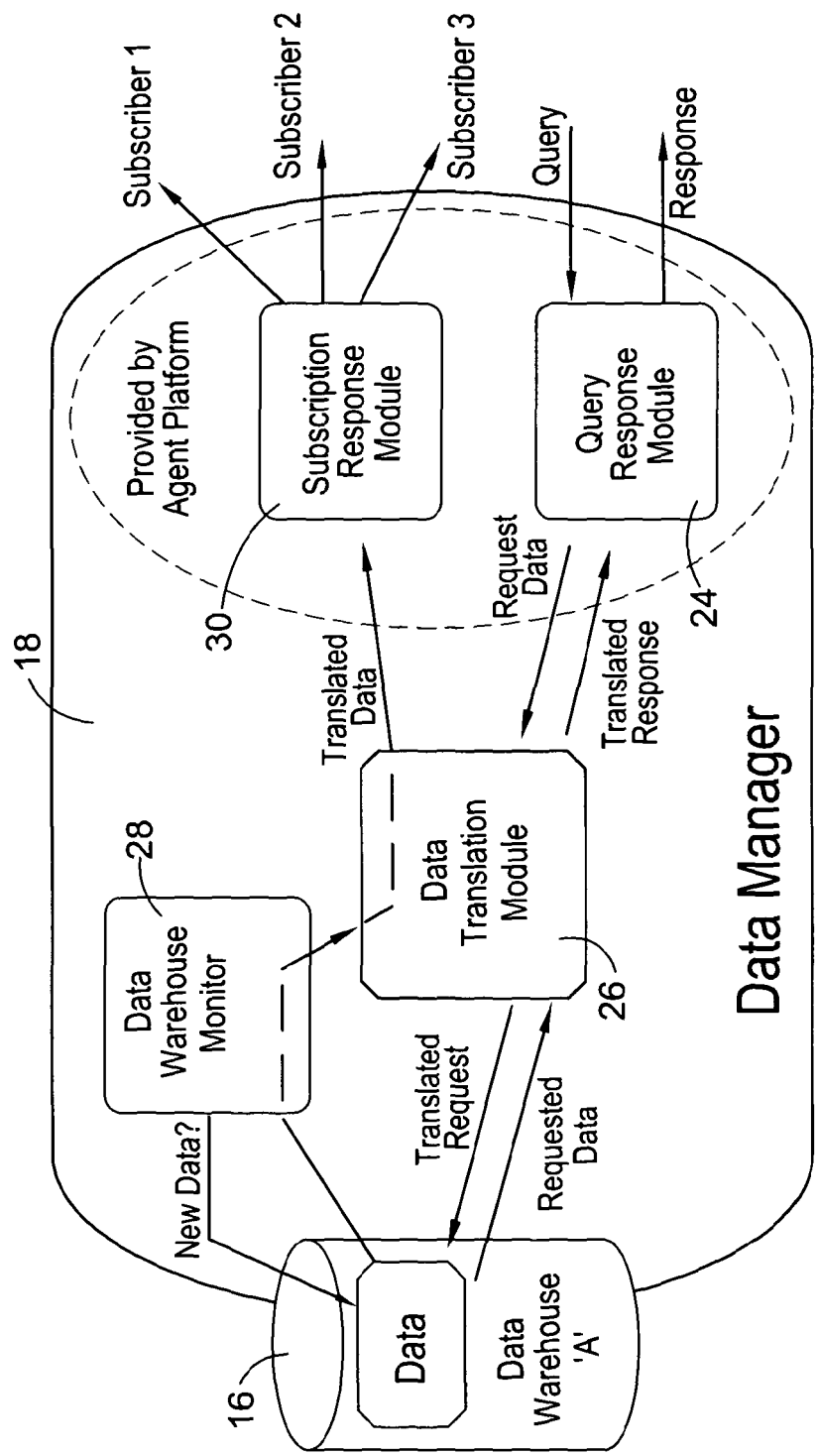
FIG. 9 is a schematic diagram of a data manager for use in the system of FIG. 1.

FIG. 9 shows various functional modules within a data manager 18. Each data manager 18 is configured to provide three main responsibilities, these being: to provide access to its underlying data warehouse 16; to monitor the data warehouse 16 to detect when new data has been added, and to communicate this data to other agents within the system. To provide these, each data manager 18 has a query response module 24 for receiving and subsequently responding to user queries; a data translation module 26 for translating queries into a suitable form to allow access to the data warehouse 16 and likewise data into a suitable form that it can be communicated within the agent system; a data warehouse monitor 28 for monitoring new data in the data warehouse 16 and a subscription response module 30 for communicating information on new data to subscribers.

Figure 10:
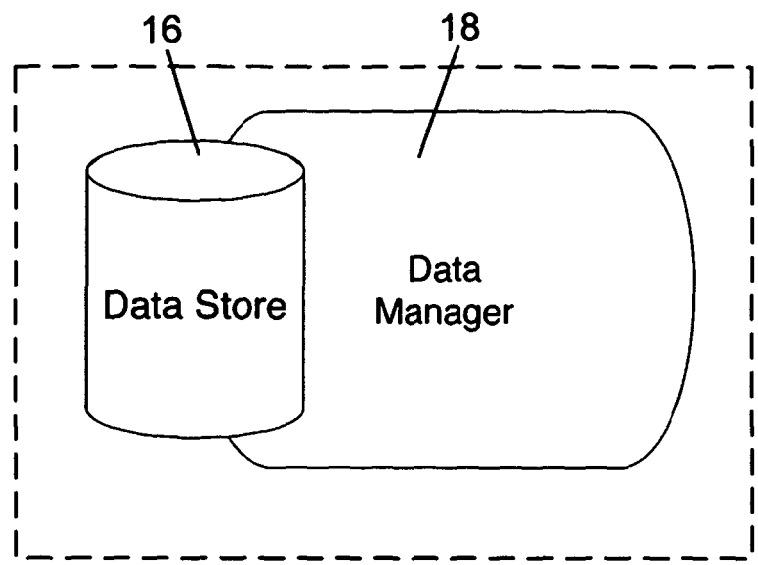
FIG. 10 is a block diagram showing the data manager of FIG. 9 implemented on the same machine as a data warehouse.
Figure 11:
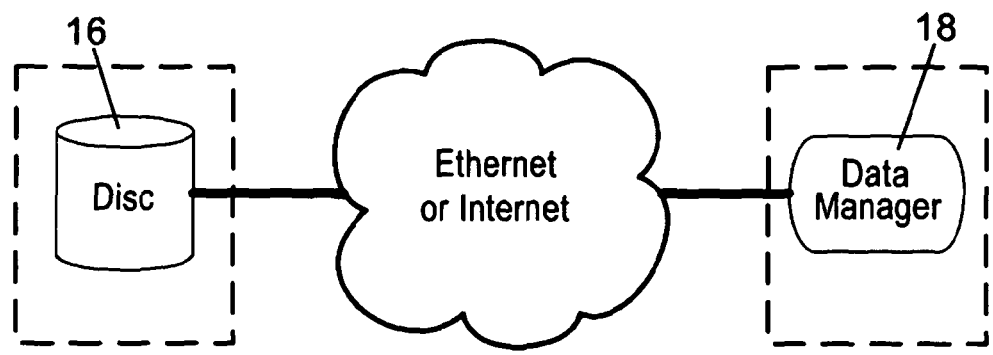
FIG. 11 is a block diagram showing the data manager of FIG. 9 connected to the data warehouse over an Ethernet or the Internet.

The connection from data manager 18 to data warehouse 16 is specific to the method of data storage being employed. Data storage approaches encountered may range from commercial databases designed for the stockpiling of large volumes of data to excel spreadsheets or simple file and folder systems. Therefore, each individual data manager 18 requires a minimal amount of specific information when it is created. The data manager 18 can be set up to run locally on the same machine as the data warehouse 16, as shown in FIG. 10. However, this need not be the case. The data manager 18 could equally connect to the data warehouse 16 over a network or Internet connection, as shown in FIG. 11.

The data warehouse monitor 28 is responsible for repeatedly querying the data warehouse 16 as to the arrival of new data and retrieving this data when it becomes available. The subscription response module 30 keeps a record of all other agents that have expressed an interest in the data the data manager 18 can provide and sends any newly discovered data to these agents as soon as it becomes available. The query response module 24 accepts queries for data from external agents and returns any data matching the inquiry.

Figure 12:
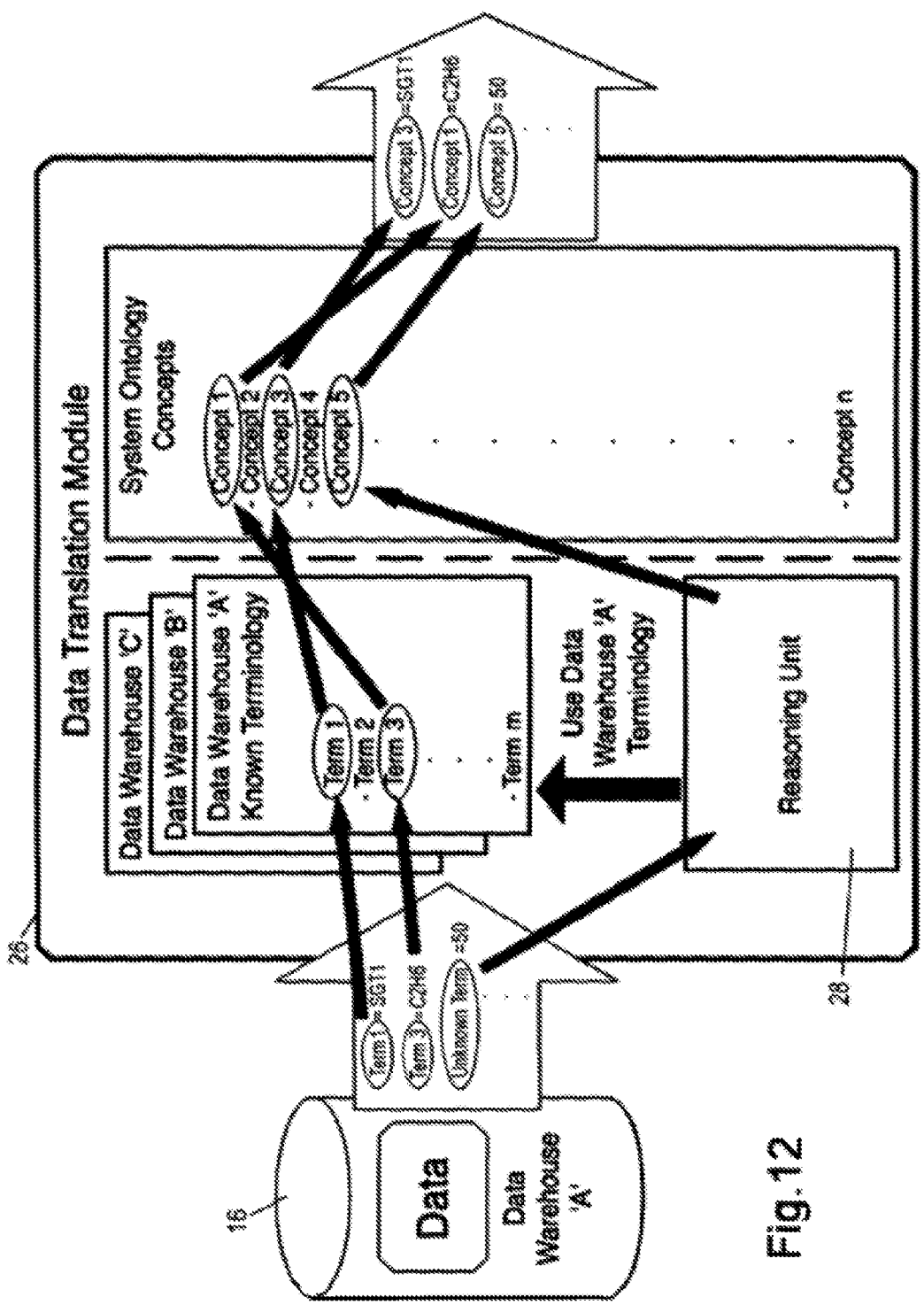
FIG. 12 is a block diagram of a translation module in the data manager of FIG. 9.

FIG. 12 shows the data translation module 26 in more detail. This is a reusable and extensible functional block. It contains an understanding of all system ontology concepts. For example, terminology from data warehouses A, B, and C is mapped onto the system ontology, so that data for each warehouse can be translated into a form that is usable by the overall system within the system ontology. These can be extended whenever the system is required to accommodate data from additional domains. It also contains knowledge of the terms used within the data warehouse 16 previously investigated using the system. Further terminology sets can be added as unfamiliar data warehouses 16 are encountered over time with future system deployment.

To determine which of the terminology sets is appropriate for the data warehouse 16 being interrogated, a data reasoning unit 28 is provided. Having determined this, data can be extracted from the warehouse, and terms found within the chosen terminology set are mapped directly to their equivalent system ontology concepts. For instance, FIG. 12 shows Term 1 for data warehouse A, which has value=SGT1, being mapped to Concept 3 in the system ontology, with the value remaining unchanged. If terms are discovered in the data warehouse 16, which are unknown within the relevant terminology set, the data reasoning unit 28 can once again be used to attempt to determine an appropriate translation. The DTM also functions in reverse in a similar manner. In this case, the system ontology concepts are mapped to appropriate data warehouse terms, the relevant terminology set having been chosen by the data reasoning unit.

Figure 13:
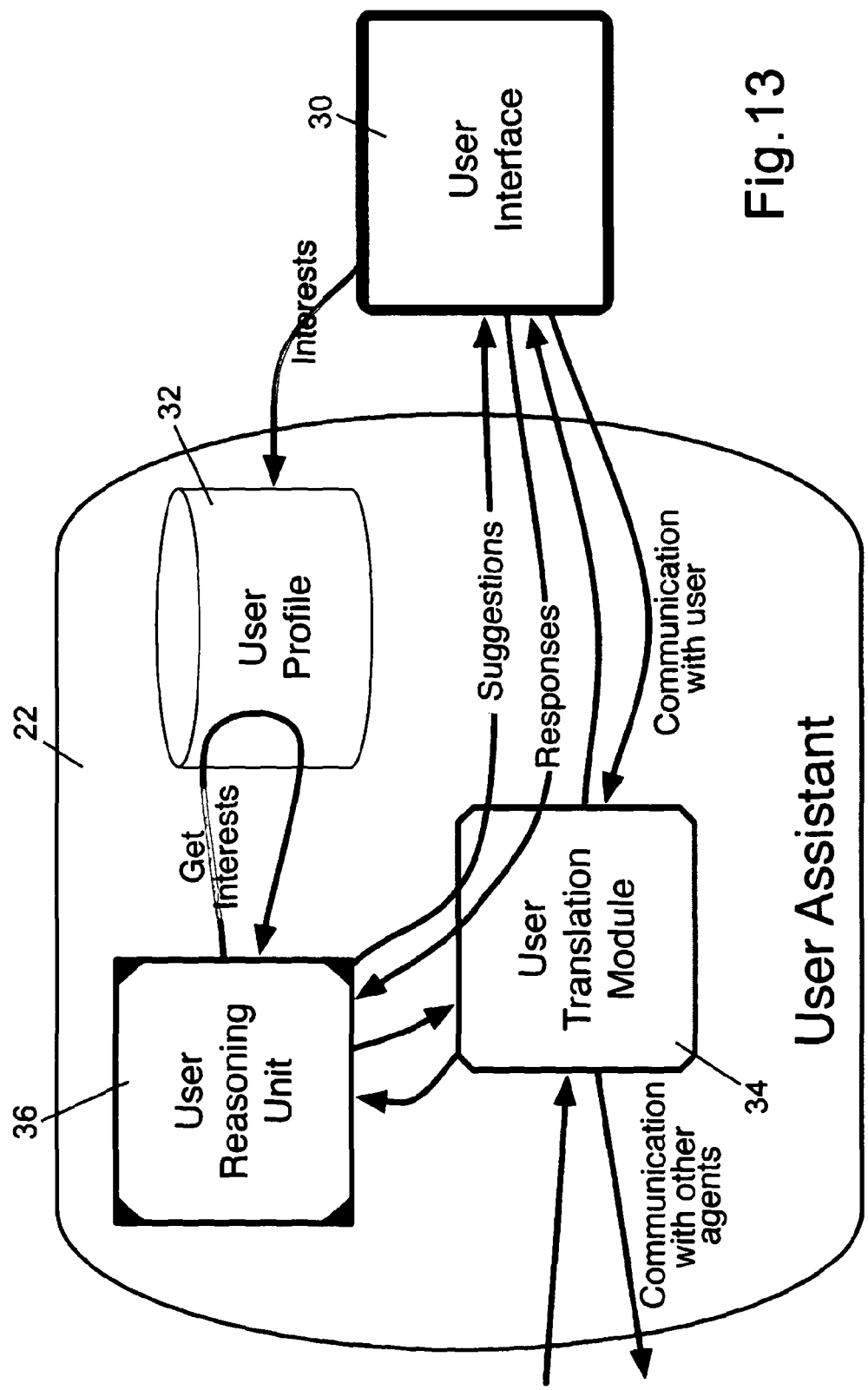
FIG. 13 is a block diagram of a user assistant for use in the system of FIG. 1.

FIG. 13 shows a user assistant 22. This has an associated user interface 30 for communicating with a user terminal; a user profile 32 for storing details of the information the user needs; a user translation module 34 and a user reasoning unit 36 that has access to high-level concepts defined within the ontology and is responsible for helping to build a user profile. The user reasoning unit 36 may exploit the relationships within the ontology to define the type of data and services a user is interested in and instigates searches in order that it may present tangible, real, existing data of this type to the user, either simply for display or in order to query their interest. These steps may be executed cyclically when required, although this may not be necessary unless the user indicates that they wish to update their profile.

In a similar manner to the data manager 18, the user translation module 26 performs a translation from system ontology concepts to the end-users' normal vocabulary before presenting any information. Conversely, the users' vocabulary must be translated to the system ontology before messages can be sent from a user assistant. Hence, all communications between the user and the user assistant 22 go via the translation module 34. Likewise all communications between the user assistant 22 and any other agent go via the translation module 34.

The primary function of the user assistant 22 is to help a user define the information that they need in a flexible and adaptable way and provide, through its interface, a single point of access for all available data and information sources. The user interface 30 need not be physically linked with the user assistant 22 i.e. running on the same platform. The user assistant 22 may run on a central server or a user's local machine and interact with the interface via a network, web service, etc if necessary. Consequently, the user interface 30 may be deployed as installed software, a web-based tool, etc.

In order for the user assistant 22 to identify the general interests of the user, the user reasoning unit 36 must be able to reason over the system ontology using the inheritance and association relationships within the ontology to query the user on their responses to questioning. Once the user reasoning unit 36 has begun to ascertain these interests, the user assistant 22 must discover what relevant data is available within the overall system. This functionality relies on agents being able to advertise what they can provide, and finding agents that they need to interact with. Here, this advertisement capability has been described with reference to the Data Searcher and Service Searcher; however, a skilled person will appreciate that other approaches could be used, and these are purely provided as examples.

Figure 14A:
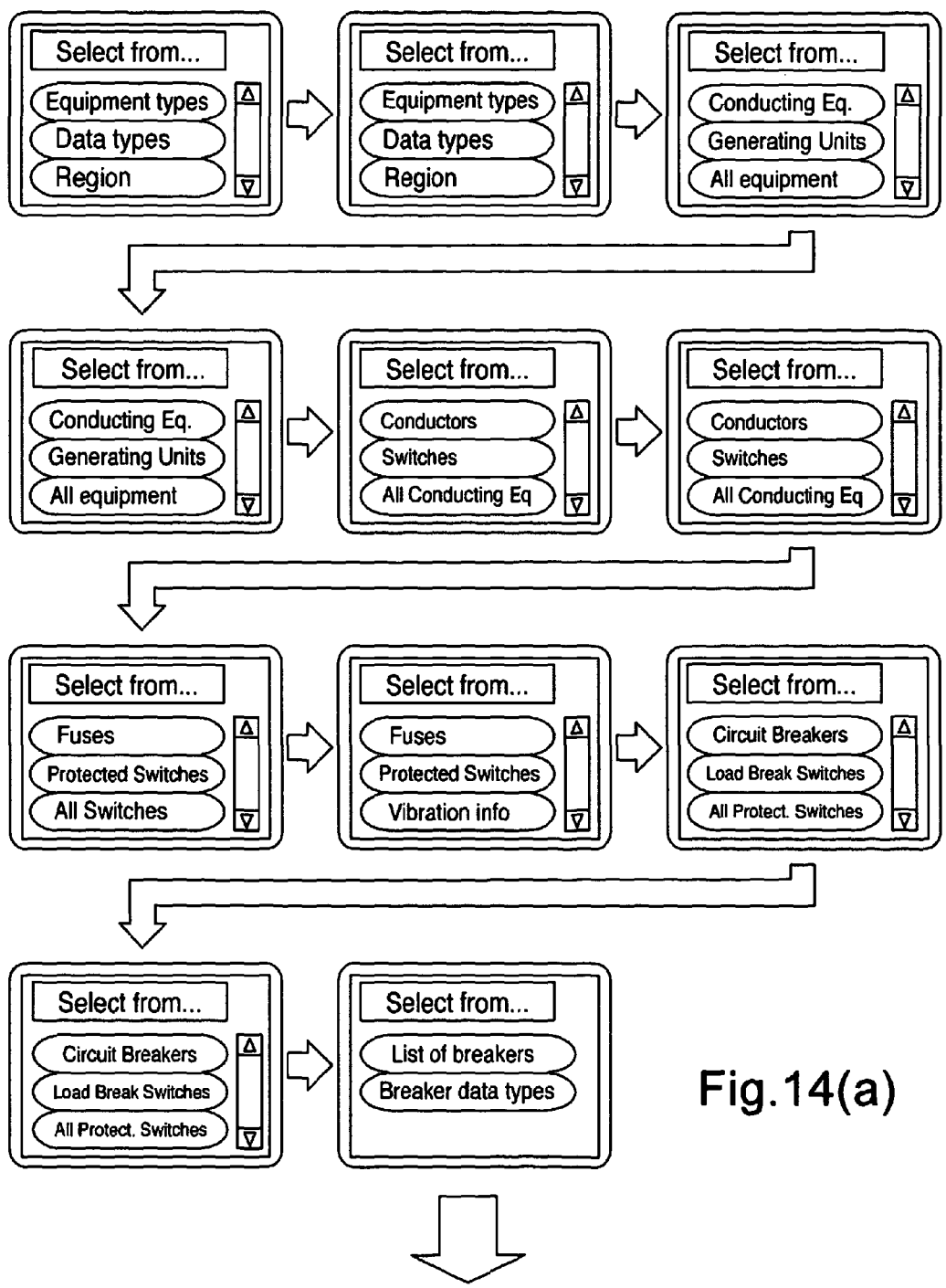
FIGS. 14(*a*) to (*c*) are a flow diagram of the steps for defining a user profile.
Figure 14B:
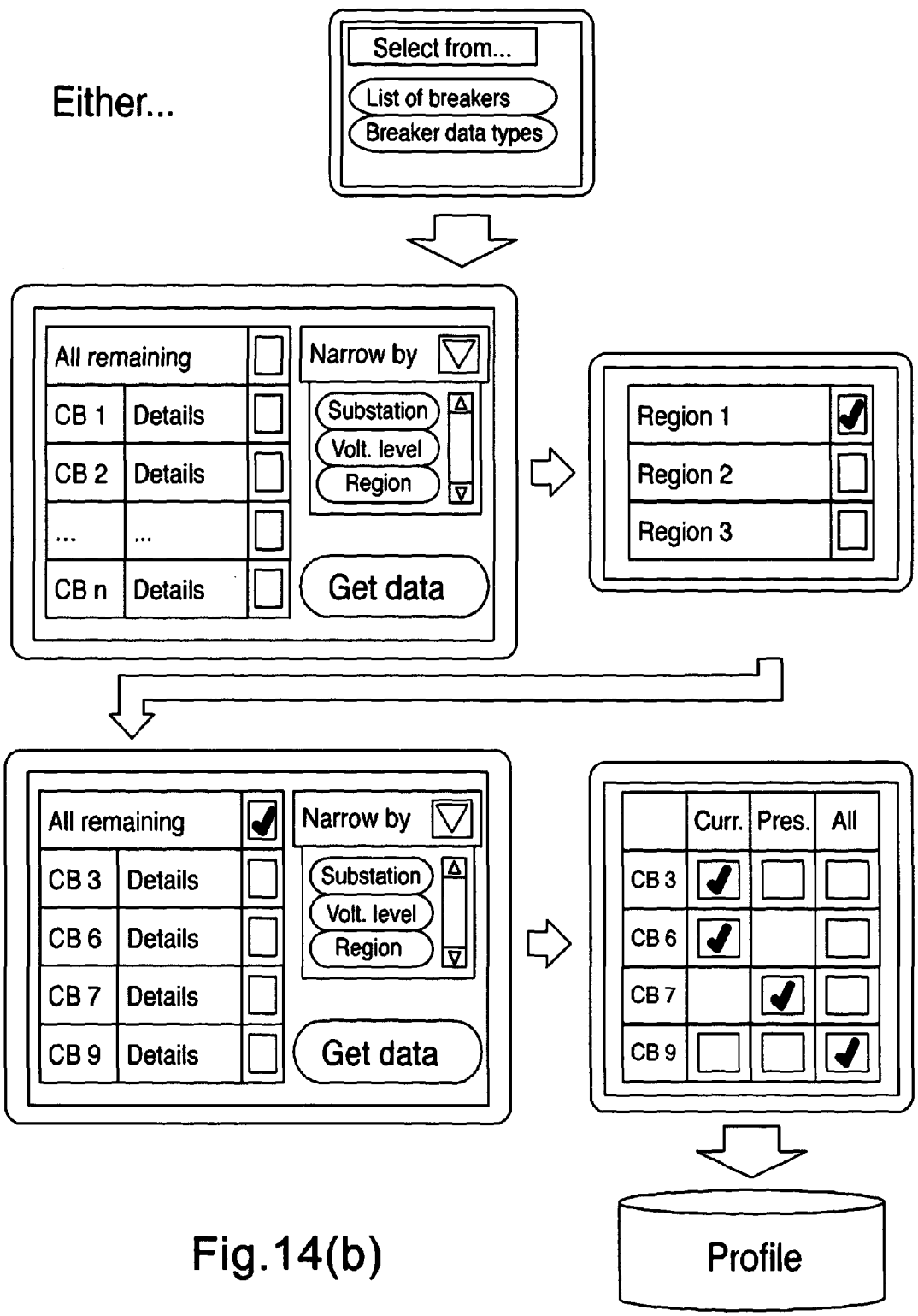
Figure 14C:
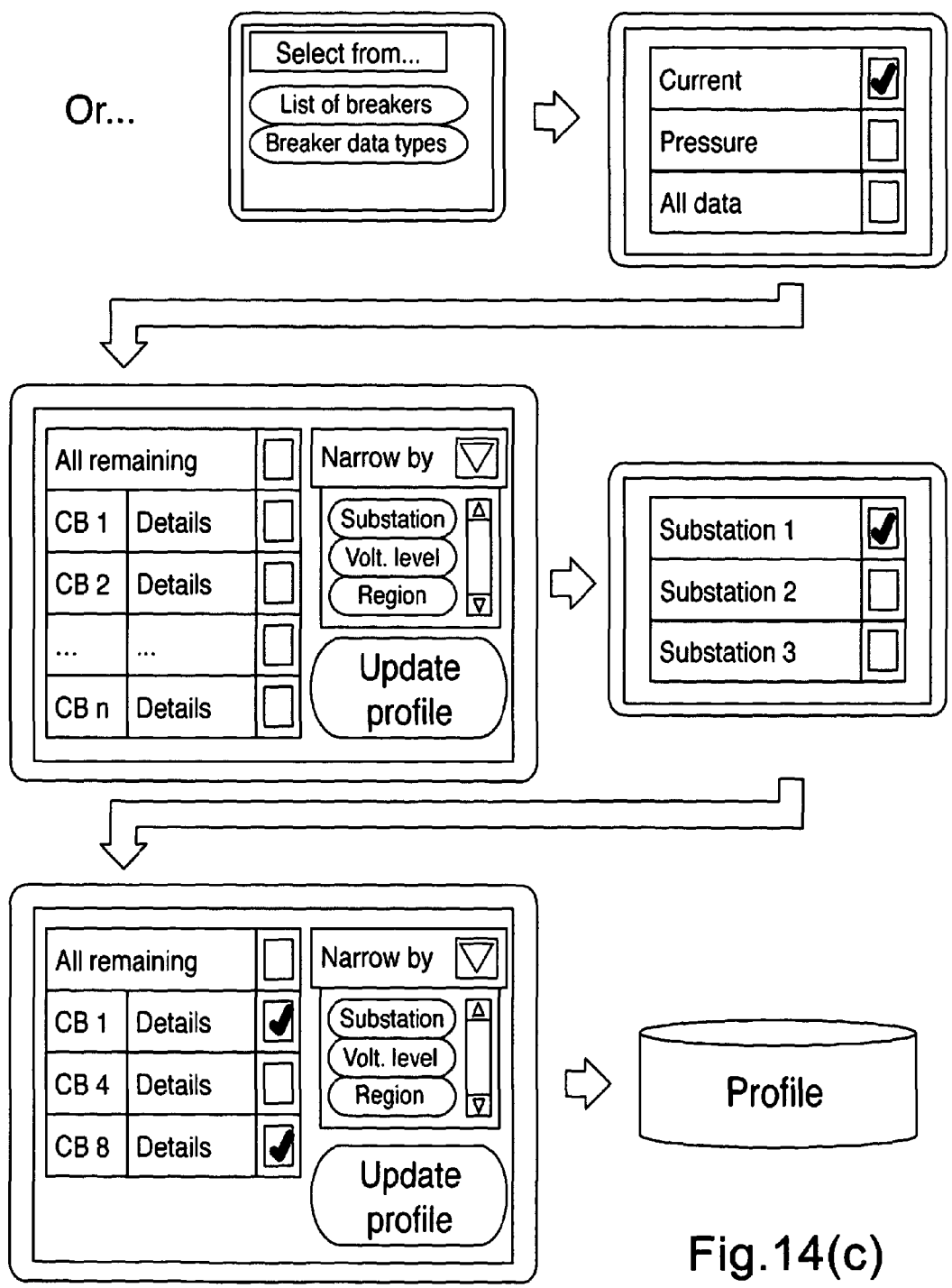

To identify the general interests of the user, the user assistant 22 first asks the user to state their interest at a high level—perhaps the type of equipment or data they are interested in or the region they are responsible for, etc, as shown in FIG. 14(*a*). With an interest in a high-level concept understood, the user reasoning unit logically deduces from the ontology how to best narrow the interest. For example, if a user specifies that they are interested in concepts that can be further specialised, such as conducting equipment, they would be presented with the various known types of conducting equipment, for example energy source, switch, conductor, etc, and asked if they wished to specialise their interest further. By following this type of process, it could be found, for example, that the user is actually interested specifically in breakers. The user assistant guides the user to this selection, giving them an opportunity to request information on all equipment of the current selection at each stage.

Alternatively or additionally, if the user knows in advance what they are interested in, a drop-down list or expandable tree of all, say, equipment could be provided including all equipment types within the current category. So, for example, if the user had only specified an interest in equipment, the list would contain all possible equipment types, but if they had already stipulated an interest in switches, only types of switch would be included. Keyboard or equivalent entry of search terms also could be provided to assist users in tracking down their interests. In this case, the user reasoning unit would search for ontology concepts likely to be matches for the user request. The user would be asked to select the concept of interest and profiling continues. This also indicates that the user configuration processes outlined here may not always be required to complete in their entirety; instead, a user assistant may, for instance, gather high-level interests of the user, search for all information available to them at that stage, and present everything as an expandable tree for selection. A skilled person will understand that the particular manner of implementation in this regard does not alter the underlying novelty here described.

Having identified an initial type of interest, a search is made within the system for physical objects relating to this type. To do this, the Data Searcher is asked to identify which data managers 18 can provide the relevant information. This information can begin to be displayed to the user at this stage, giving them the opportunity to select items in which they are definitely interested. Reasoning can continue alongside this and association relationships can be used to further narrow interests. For example, users can be asked if they are interested only in particular regions, in all equipment within particular plant or substations, in only certain types of measurement associated with a pre-selected equipment type, as shown in FIGS. 14(*b*) and (*c*). Searches run frequently at this stage, as the user assistant constantly queries exactly what information is available concerning the user's choices. At all stages, the selections or questions presented to the user are based on both the system ontology and an understanding of what is available within the system.

The user assistant 22 may note with the Data Searcher that it has one or more particular interests and request that it be kept up to date of future changes relating to these. The Data Searcher supplies addresses of data managers 18 relevant to these one or more interests, allowing the user assistant to contact them directly. The user assistant 22 may either send a query to these data managers 18—a one off request for data (of a particular type, from a particular date, etc) or request to subscribe to any future information they provide. In the FIPA-based embodiment here described, these requests are sent as ACL messages with query and subscribe being communicative acts. The contacted data managers 18 reply with the requested data either immediately, in the case of a query message, or ad infinitum when new data becomes available, in the case of a subscribe message. In this way, by first establishing user interests, the user assistant 22 takes care of delivering relevant and desired data to the user by contacting whichever information sources are required. There are no hard-coded links between information sources (raw data, analysis, interpretation, other).

Once the user assistant 22 establishes an understanding of the user's primary interests relating to equipment and data they wish to inspect, it stores these in a user profile. Based upon this profile, it can then query the Service Searcher for agents providing analysis and interpretation functionality. The user may select which of these they would find useful. The user assistant 22 then contacts discovered service managers 20 directly to request access to the desired services. A service manager 20 may at this stage spawn a new service agent to actually provide the service. If they do, they inform the user assistant of the new agents' details, allowing them to be contacted directly. The user assistant 22 handles information gathering from service managers/agents, contacting them using the standard query and subscribe communicative acts and displaying new information to the user when it is received. Also, the personalised user preferred terminology of the user translation module 26 is updated so that when a concept is ever presented to the user in future, it is presented not with the system default terminology, but instead using the user preferred nomenclature.

In addition to allowing flexible selection of the types of information, the user assistant allows the user to customise the look and feel of their interface. They are able to select their preferred level of detail (e.g. high level interpretations of data only down to low level measurements), whether they want their display to continually refresh with new information or simply provide immediate access to it when asked, exactly how they would like data to be displayed (e.g. tables, graph plots, etc), and so on.

Figure 15:
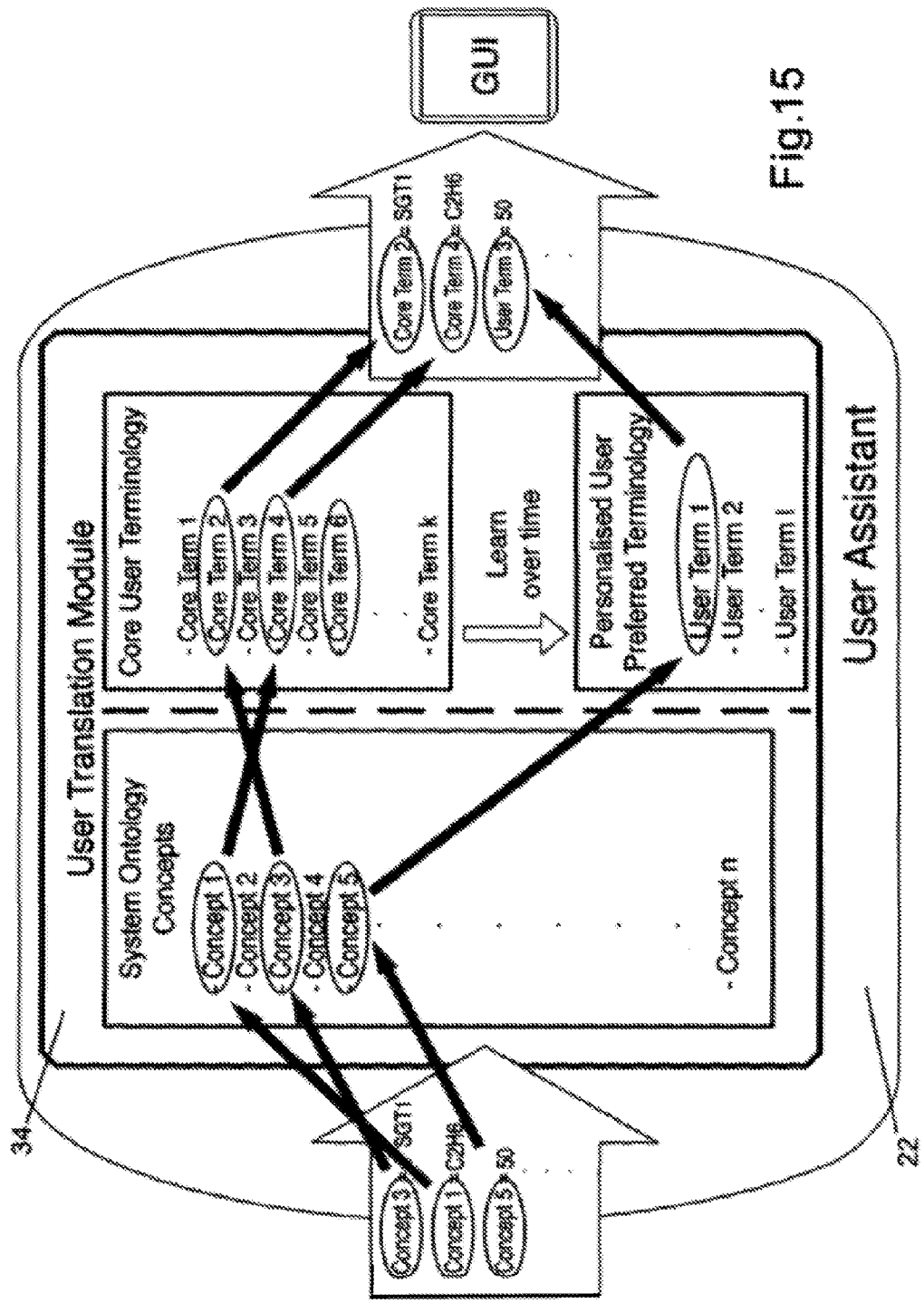
FIG. 15 is a block diagram of a translation module in the user assistant of FIG. 13, showing information flow from the system to the user.
Figure 16:
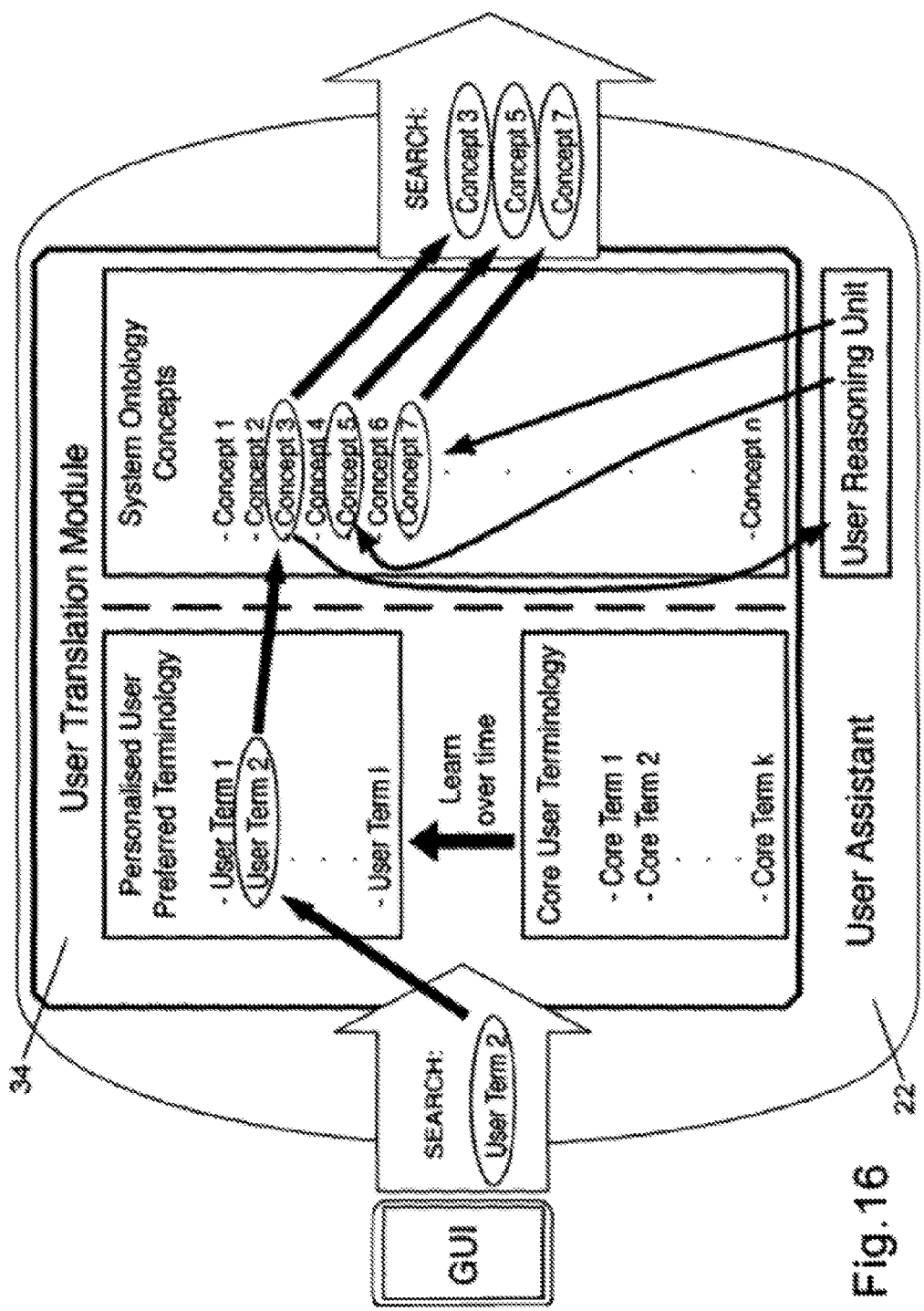
FIG. 16 is a block diagram of the translation module of FIG. 14, but showing the flow of information resulting from a user query to the system.

FIGS. 15 and 16 detail the operation of the user translation module 34. This is, like the data translation module, an extensible and reusable functional block containing an augmentable understanding of all system ontology concepts, which are mapped, initially, to a terminology set of pre-defined user vocabulary. Over time however, the user translation module 34 learns the preferred vocabulary of individual users and so modifies appropriate mappings.

FIG. 15 shows the response when a message from the external system is received by a user assistant, and is to be displayed to the user. This shows three incoming concepts, which must be transferred to user vocabulary. The first two of these, Concept 3 and Concept 1, are simply mapped to their known equivalents in the core user terminology set. The third, Concept 5, is known to have an equivalent term within the core user terminology set. However, an equivalent term is also recognised within the personalised user preferred terminology set and so this is the mapping chosen.

FIG. 16 shows the reverse of this process, i.e. the translation required to communicate user input to the external system. This shows by way of example, the process for transmitting a user search request to the system. When a user searches for a particular vocabulary term known to them, this must first, of course, be translated to its system ontology equivalent concept. However, in addition to this, by applying reasoning to the appropriate concept, related concepts that may also be beneficial to the user and would add value to the search can also be identified. This leads to a much broader search and helps users discover relevant data and information available to them, which they may not have previously considered or even been aware of.

The task of the user assistant 22 does not stop at setting up an initial user profile. It also stores this profile and makes sure that the user is kept constantly informed of relevant changes and updates within the overall system. Two parallel approaches provide this functionality. Firstly, the user assistant 22 subscribes to updates from the Data Searcher and Service Searcher concerning particular interests. When informed of updates, the user assistant 22 can contact new data managers 18 and service managers 20 directly to query them for exactly what they provide before taking this information to the user for approval or refusal. Secondly, the user reasoning unit 36 in the user assistant 22 may periodically bring search requests to the Data Searcher and Service Searcher for known interests or interests relating to known interests, as obtained by reasoning by the user reasoning unit within the ontology. Any new providers revealed by these searches, can be contacted first without the user's knowledge so that when the user is interrupted for approval, their time is not wasted. It may be possible, over time, to learn the user's general responses to these interruptions, and accordingly approve or refuse up-dates for them. Many different approaches could be taken to this learning from statistical analysis right through to intelligent behavioural learning algorithms such as those that could also be applied to interpreting measured data for condition monitoring. Furthermore, interruptions may not be required if a feed is used to deliver the new information to users. This would allow users to respond to the updates in their own time.

Agents, by their goal-directed behaviour, self-organise themselves into functional groupings, which may well change over time, in order to provide exactly what is required by users at any given time. The self-organisation is driven by the interaction between the user profile in the user assistant, the user translation module 26 functionality, and the reasoning functionality also in the user assistant, the system ontology and the data translation functionality, which resides in the data manager 18. The user assistant ensures that all system updates are made available to the user, so that the user interface can be dynamically up-dated as and when system changes with relevant information are detected.

All agents within the system are likely to perform a similar procedure when they are required to carry out their various tasks; however, most of them, unlike those associated with the users, will know in advance exactly the type of information which they require in order to fulfil their goals. For example, a service manager 20 that provides knowledge-based diagnosis of vibration signatures. When this is initially created, it contacts the Service Searcher and registers that it can provide diagnosis of vibration data. If the service manager 20 is subsequently asked to provide its service, it first searches the Data Searcher for sources of vibration data and then contacts them directly to receive the data it requires.

Figure 17:
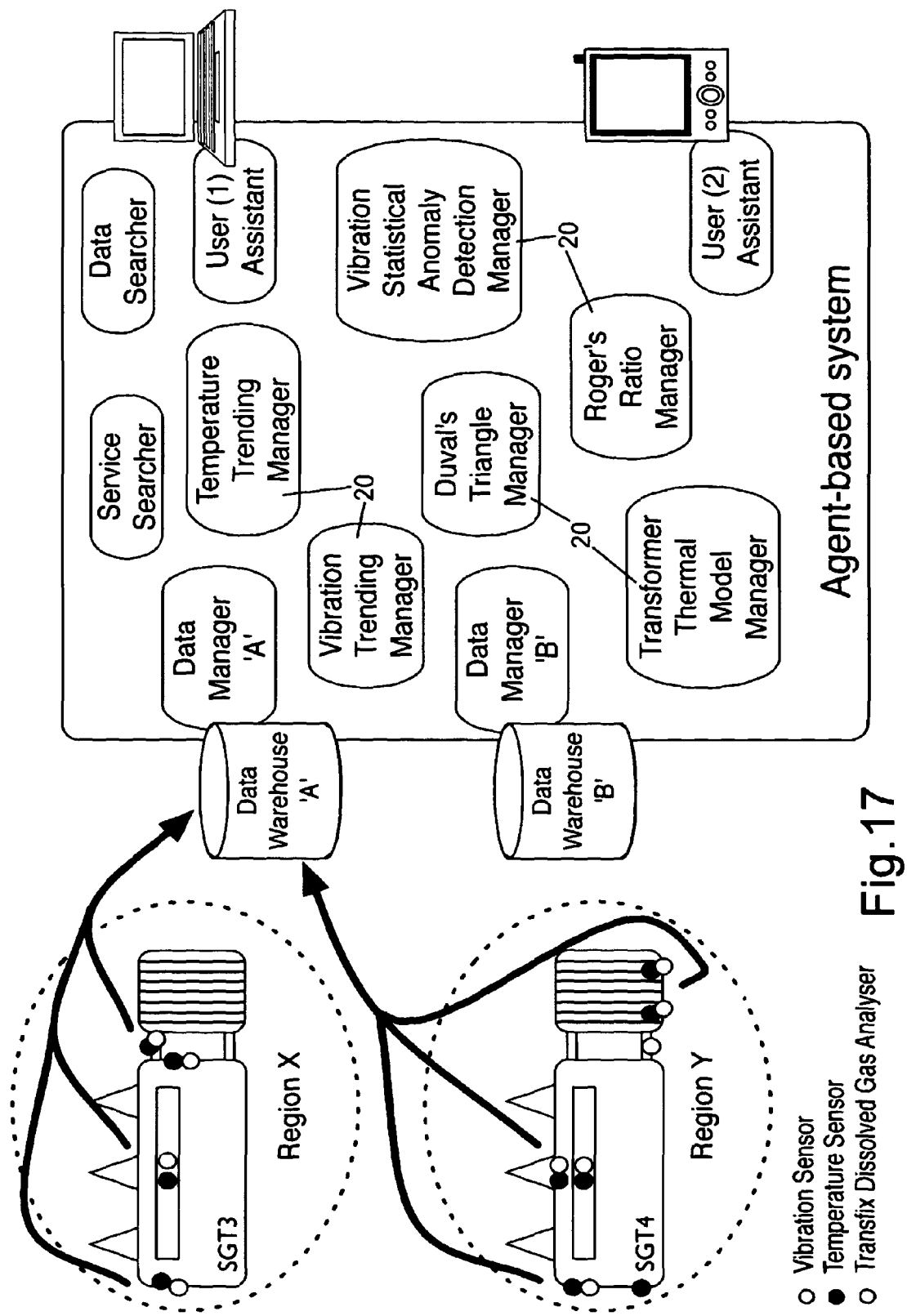
FIG. 17 is a block diagram of an agent-based condition monitoring system monitoring at least two power transformers.

FIG. 17 shows an example of a deployed system for power transformer monitoring featuring a number of data managers 18, service managers 20 and user assistants 22. In this case, two data managers 18 are present: data manager 'A' and data manager 'B'. These data managers 18 provide data from data warehouse 'A' and data warehouse 'B' respectively. Data warehouse 'A' is the storage facility for all vibration and temperature data recorded by sensors mounted to two transformers: SGT3 (super grid transformer 3) and SGT4 (super grid transformer 4). Data warehouse 'B' records measurements made by a dissolved gas analyser, which is mounted only on SGT4. SGT3 and SGT4 are located in region X and region Y respectively.

The system contains a number of service managers 20—six in total—each offering a form of analysis or interpretation for particular types of data. These service managers 20 are the vibration trending manager, the temperature trending manager, the vibration statistical anomaly detection manager, the Duval's triangle manager, the Roger's ratio manager and the transformer thermal model manager. Duval's triangle manager and the Roger's ratio manager are operable to carry out specific analyses. These types of calculations are well known in the power transformer field and so will not be described in detail. Two user assistants are also present: user (1) assistant and user (2) assistant. These may be running on a central server or on the users' individual devices. Wherever their location however, user 1 is accessing the system on their laptop whilst user 2 agent is working from their PDA (Personal Digital Assistant).

Figure 18:
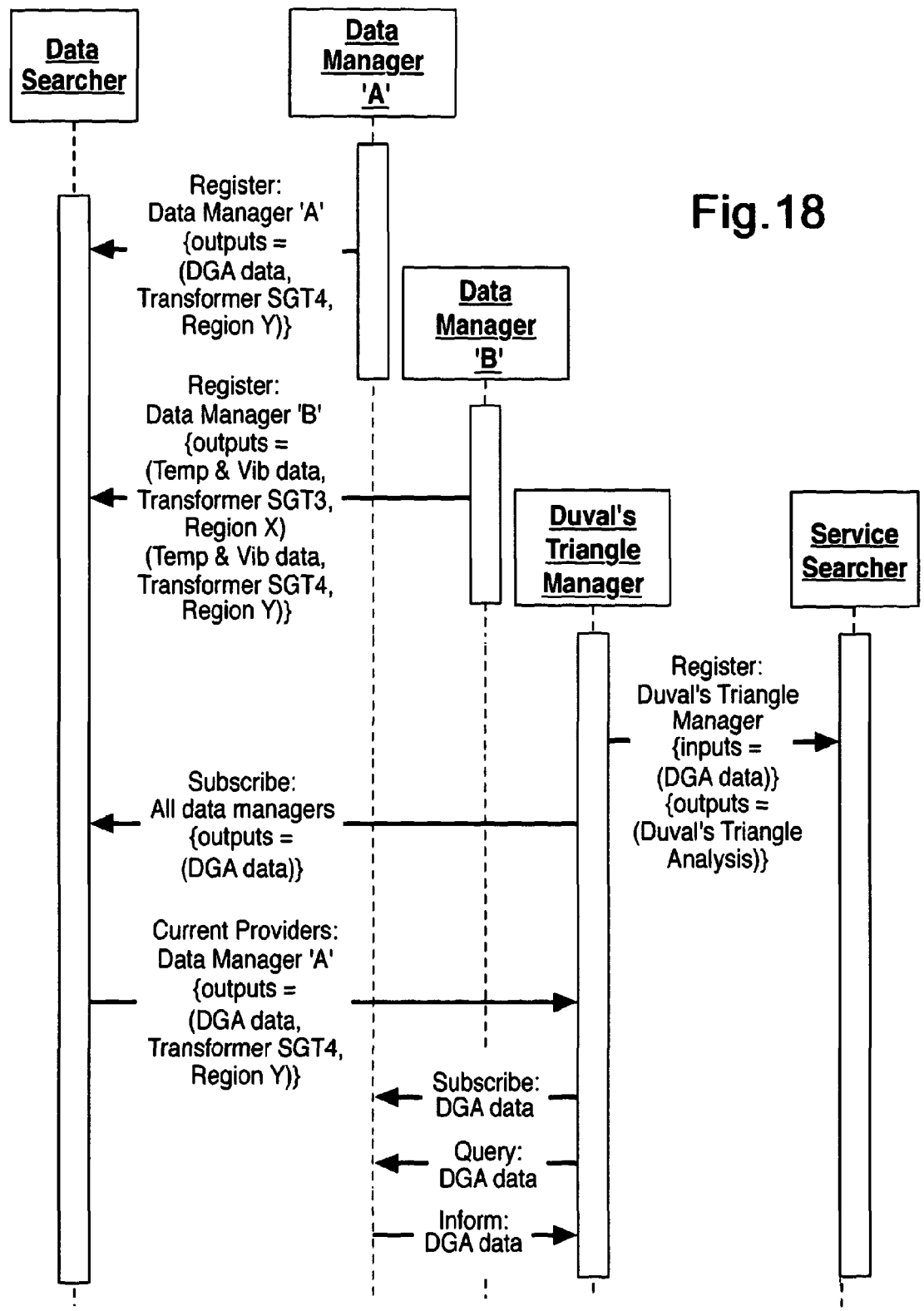
FIG. 18 is a flow diagram of a registration process for selected agents within the system of FIG. 17.

When data managers 18 are created, they first make contact with the Data Searcher and register themselves. To register, they supply their name and any outputs they can supply. Similarly, when service managers 20 are created, they contact the Service Searcher, providing the corresponding information, alongside any inputs they require to achieve their goals. The messages sent by data manager 'A', data manager 'B' and the Duval's triangle manager in performing this registration process are shown in FIG. 18, from which it can be seen that data manager 'A' registers that it can provide dissolved gas analysis data (shown as DGA data) from SGT4, located in region Y. Data manager 'B' registers that it can provide temperature and vibration data (shown as Temp and Vib data) from SGT3, located in region X, and also from SGT4 located in Region Y.

The Duval's triangle manager registers with the Service Searcher that it can provide Duval's triangle analysis. It also registers that, to provide this, it requires dissolved gas analysis data as an input. Since it requires this input to function, once it has registered, the Duval's triangle manager may carry out a search of the Data Searcher's records to find any data managers 18, which can provide it with the necessary dissolved gas analysis data. This search is labelled subscribe and is also shown in FIG. 18. Searches of this nature not only return all positive results, which the Data Searcher is currently aware of, but also cause the Data Searcher to inform the searcher if new providers become available in the future. In this way new data and services can be discovered by agents within the system immediately as they become available. The subscribe search type is used here as a clear example of the systems functionality. This search may also be performed by one-off query however. In this case, the Duval's triangle manager would re-contact the relevant data managers 18 for data to analyse upon being asked to provide an analysis result, rather than it being continually sent automatically when available.

In this case, the search results tell the Duval's triangle manager that one provider of dissolved gas analysis data currently exists; data manager B. This knowledge allows the Duval's triangle manager to contact data manager 'B' directly requesting the desired information. It carries out this query in two stages. First, it subscribes to all dissolved gas analysis data. Subscribing to data in this manner means that all future changes in the dissolved gas analysis data held by data manager 'B' triggers the sending of a message to the Duval's triangle manager informing it of the update. However, nothing is sent until the data first changes. Therefore, the Duval's triangle manager also sends a query request. This causes data manager 'B' to send all of the dissolved gas analysis data that it currently holds.

Figure 19:
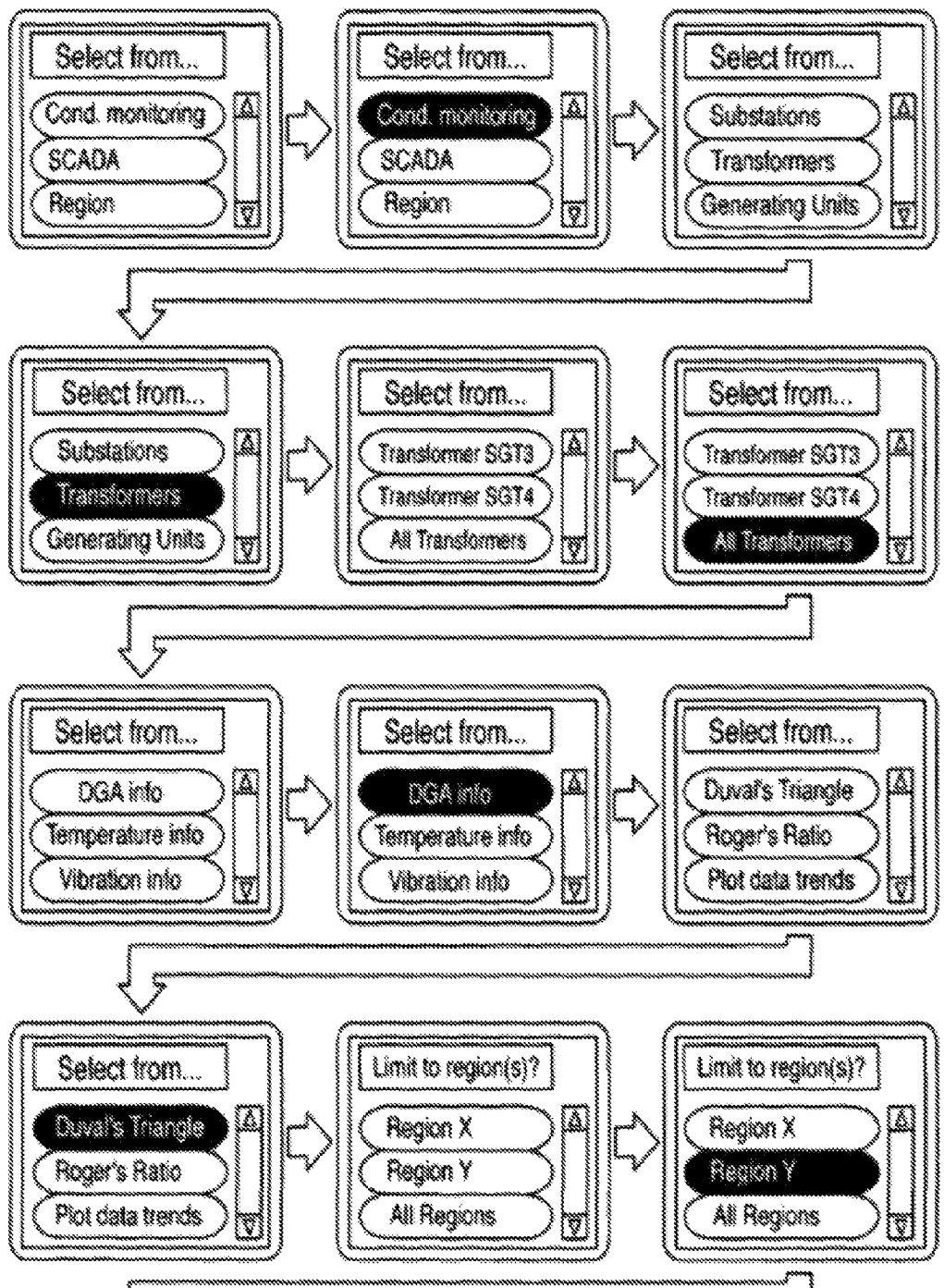
FIG. 19 is a representation of a plurality of user selection options for allowing a user to identify condition-monitoring data of interest for the system of FIG. 17.
Figure 19:
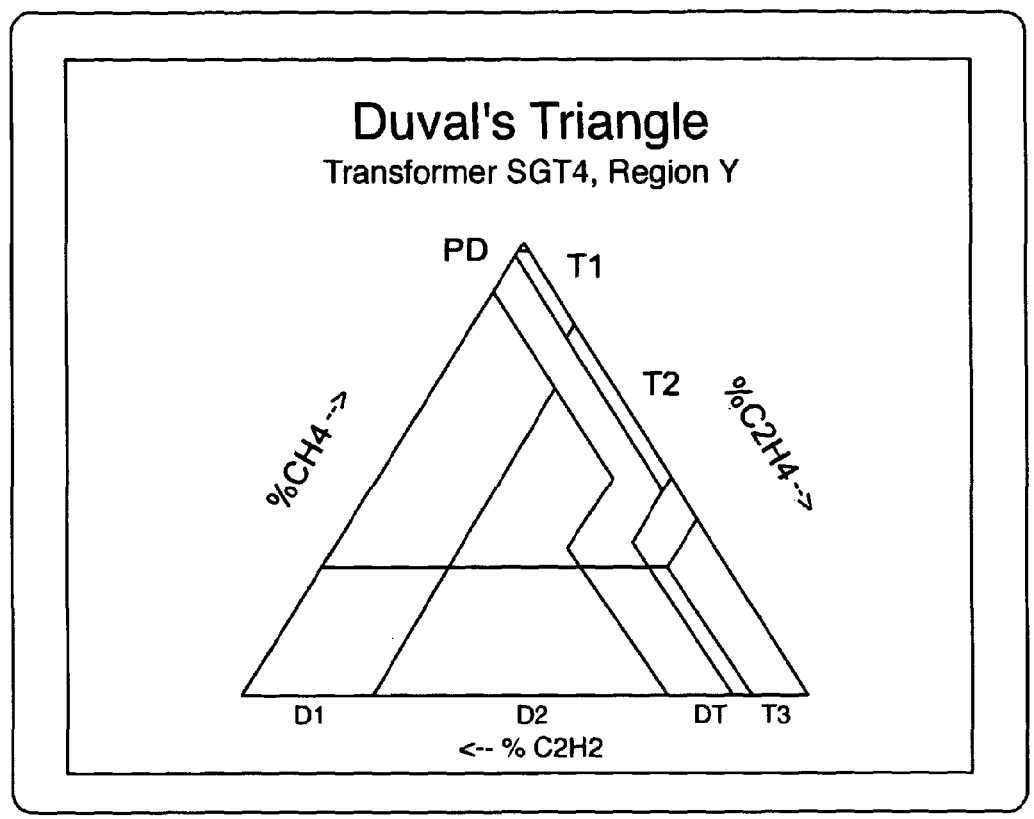

FIG. 19 shows an example of steps that a user may go through in setting up of their system for the first time from an end user's point of view. At this stage the user profile is established for the first time. The user-reasoning unit is responsible for deciding upon the choices that are displayed to a user at each stage (by exploring relevant relationships within the ontology) and for instigating appropriate searches for specific, real-world data when required. At each step in the process, the user is presented with a number of categories from which they can choose. On selection, each category expands to present a number of sub-categories until finally a selection from available data and services can be made. This process is powered by a number of searches of the Data Searcher and Service Searcher. As has already been mentioned, this process could also be handled by drop-down lists displaying all information relevant to particular categories, or expandable trees, holding all information available and allowing users to select several items simultaneously.

Figure 20:
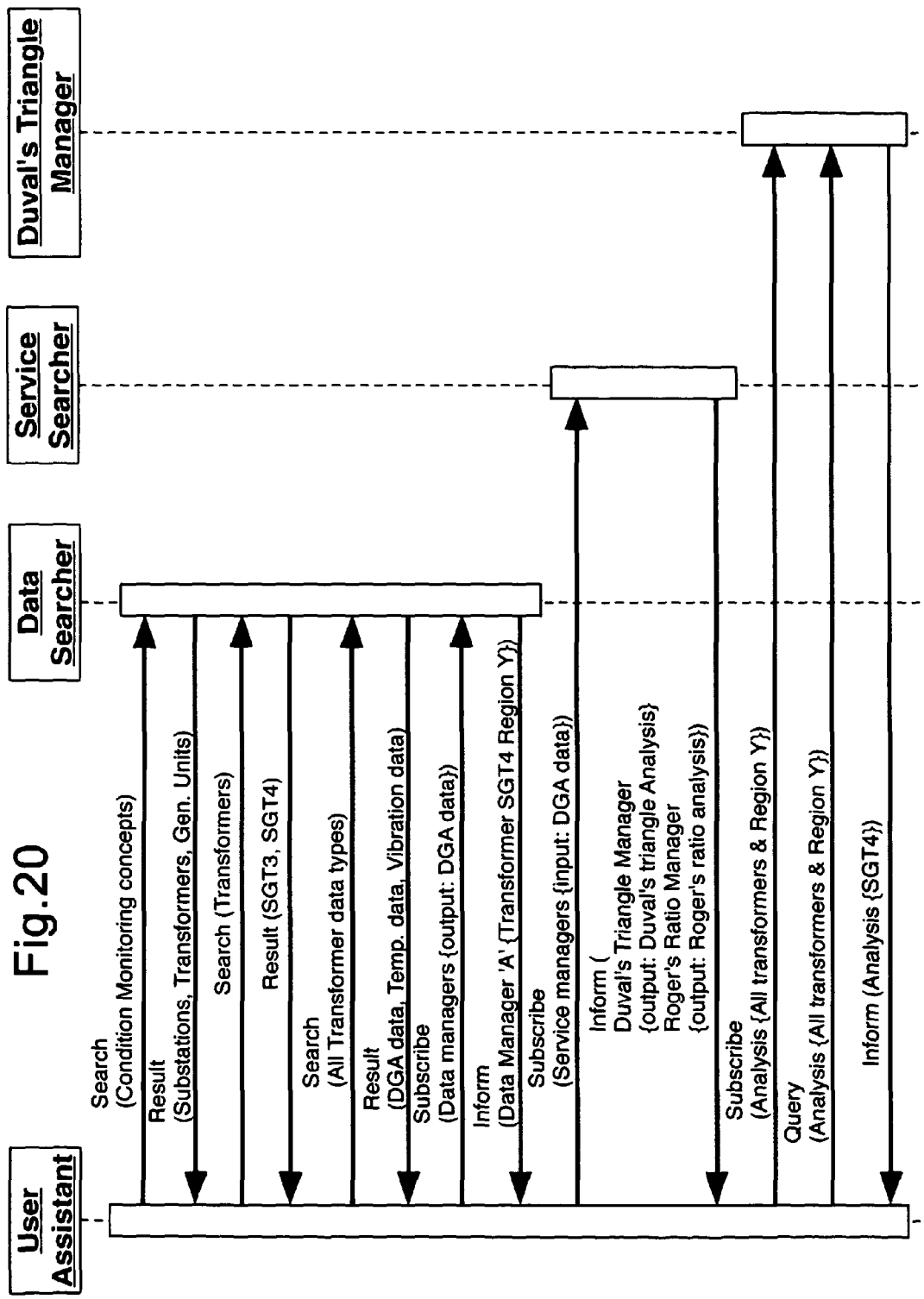
FIG. 20 is a flow diagram representing interactions that may be caused by the specific selections shown in FIG. 19.
Figure 21:
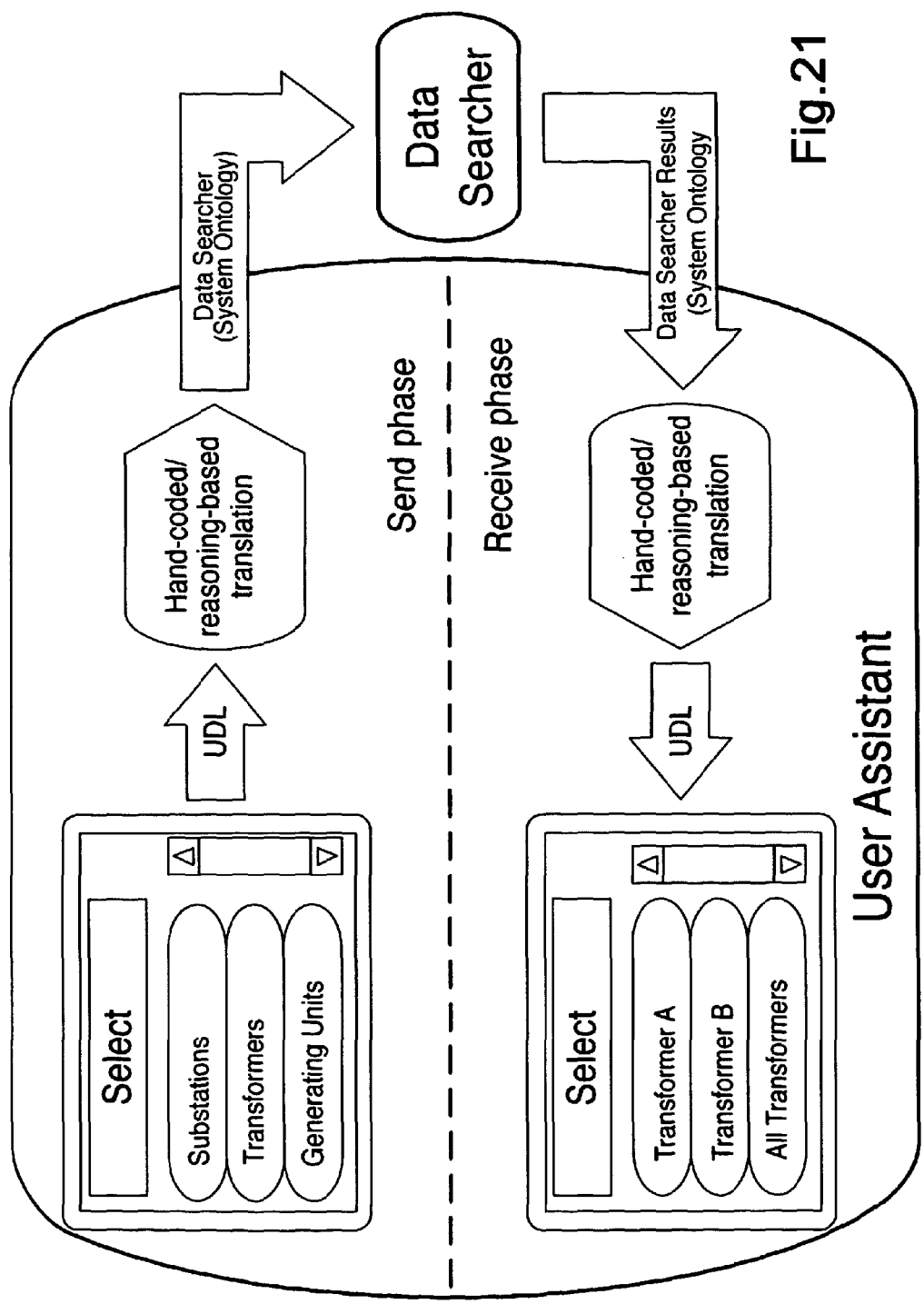
FIG. 21 is block diagram illustration of the operation of a user assistant following a specific selection in FIG. 20.

In FIG. 19, the user's first three selections of Condition Monitoring, Transformers and All Transformers, result in the first three searches shown in FIG. 20. These searches simply expand the requested category by supplying all available sub-categories. It is worth noting that all of this user input must first be translated to the system ontology, as described above, before being transmitted from the user assistant. Likewise, responses must be translated back into the user's vocabulary before being displayed, as shown in FIG. 21.

The user's fourth selection of DGA info (FIG. 19) tells the system that the user is interested in dissolved gas analysis information. The user assistant therefore sends a Subscribe search to the Data Searcher for agents capable of supplying raw dissolved gas analysis data and to the Service Searcher for those capable of supplying analysis of this data (FIG. 20). Having been informed that Duval's triangle analysis and Roger's ratio analysis are both available, alongside the option to simply plot the observed trends in the raw data, the user selects Duval's triangle analysis (FIG. 19). However, the user is informed of any newly discovered data sources or analysis techniques applicable to dissolved gas analysis data due to the manner in which the Data Searcher and Service Searcher were previously searched.

Before finally querying for the information requested by the user, the user assistant recognises that the search can be narrowed further by selection of an appropriate Region. This option is presented to the user in FIG. 19 where they select Region Y. This explains the messages sent to the Duval's Triangle manager in FIG. 20. As before, a Subscribe for relevant data is first sent, thus ensuring that future analysis results are forwarded. This is followed by a Query for any previously computed results.

Figure 27:
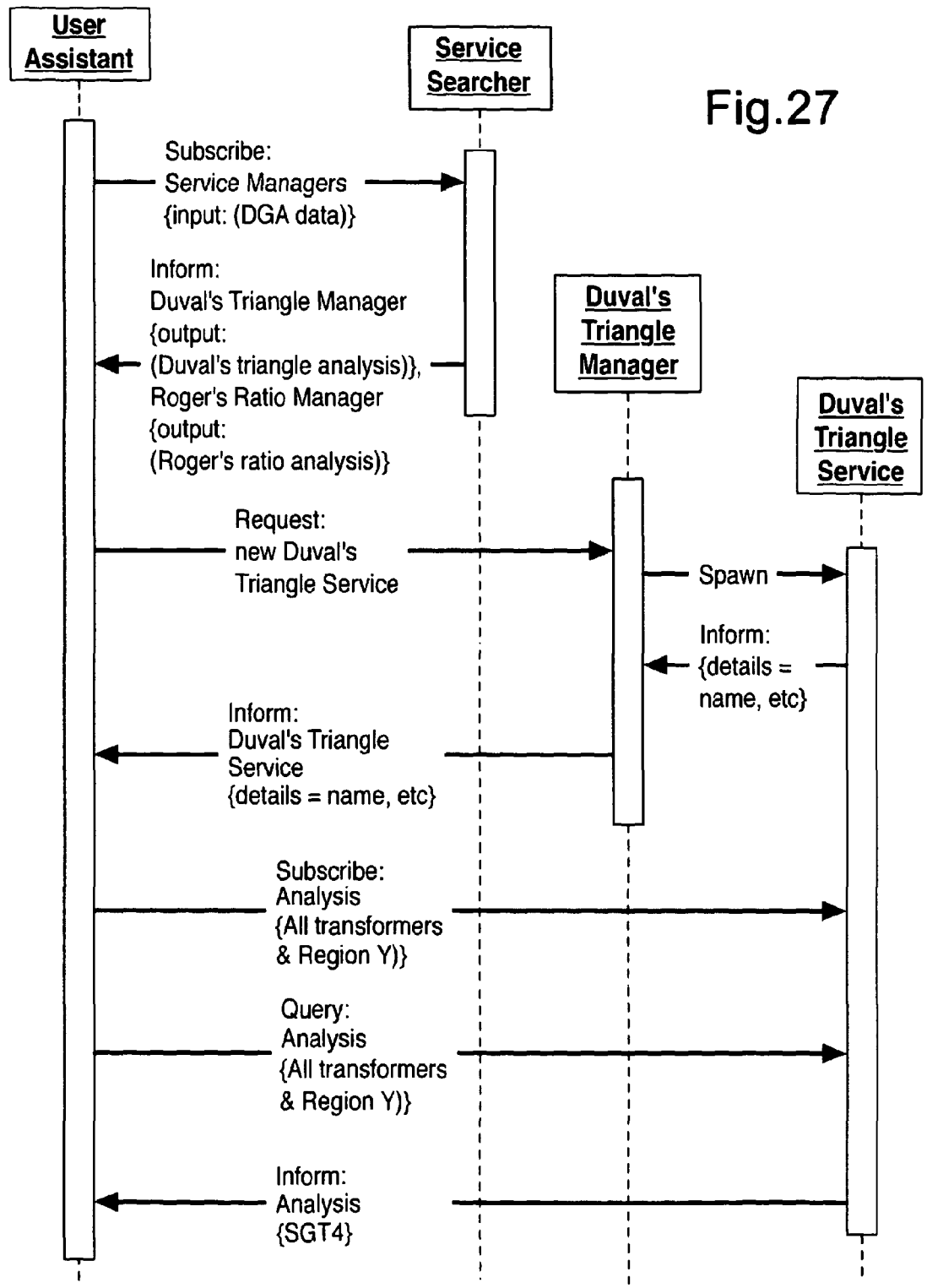
FIG. 27 is a flow diagram representing interactions that may be caused by the specific selections show in FIG. 19.

Alternatively, service managers 20 may spawn service agents to handle the actual carrying out of services. In this case, the final five interactions of FIG. 20 would be replaced by those shown within FIG. 27. Here, the Service Searcher is subscribed to as before to discover potential services relevant to the DGA data available. The user selects from these available services (in this case, they select the Duval's triangle service) and the user assistant contacts the Duval's Triangle manager. This in turn creates a Duval's Triangle service agent specifically for the user, thus ensuring that it is always available to them and they need not wait while other users' analyses are being processed. The Duval's Triangle manager informs the user assistant of the Duval's Triangle service agent's details, and the user assistant may then contact it directly. From this point, the interactions between user assistant and the Duval's Triangle service agent mirror those at the conclusion of FIG. 20.

Figure 22:
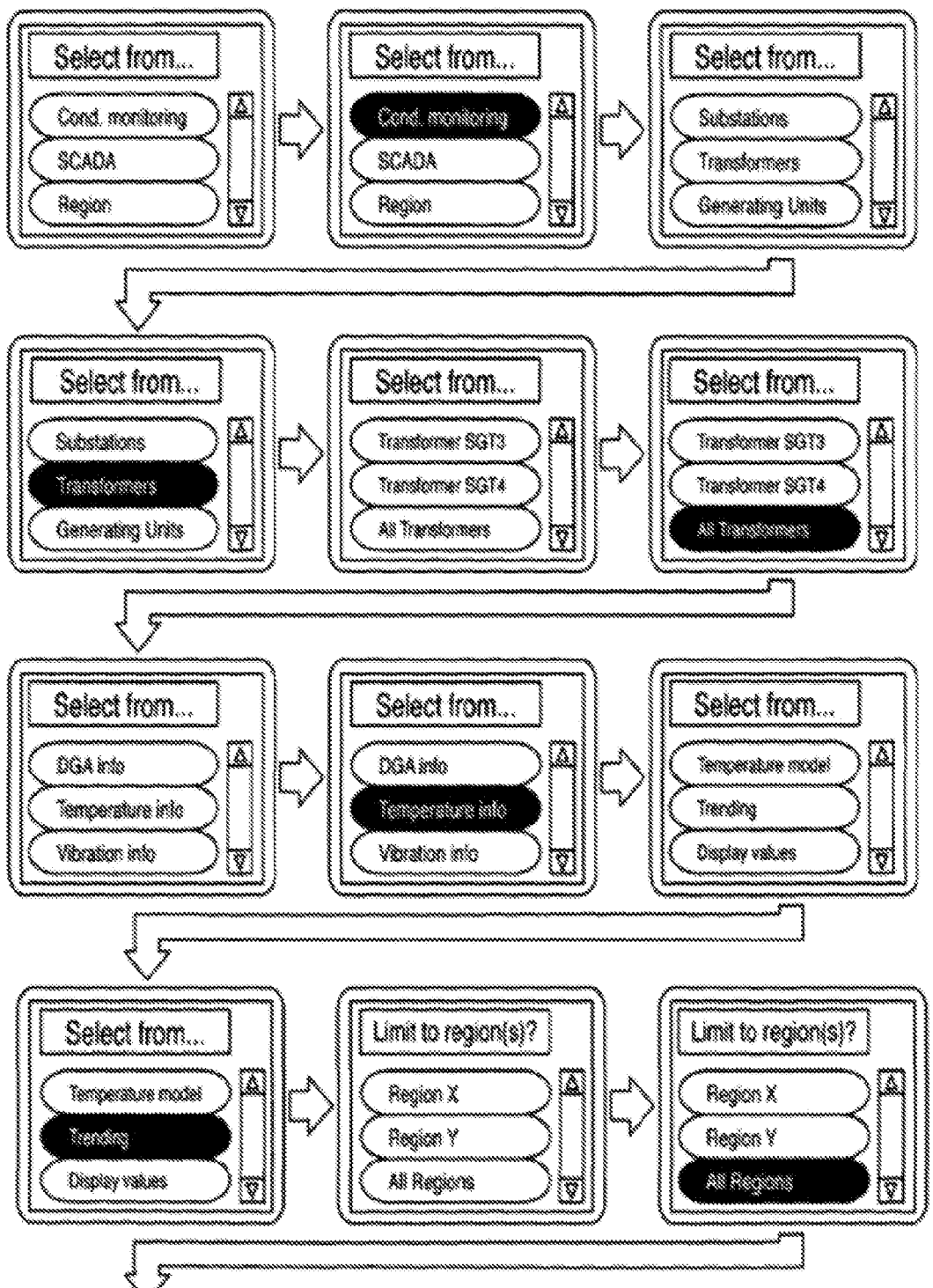
FIG. 22 is a representation of an alternative set of user selection options.
Figure 22:
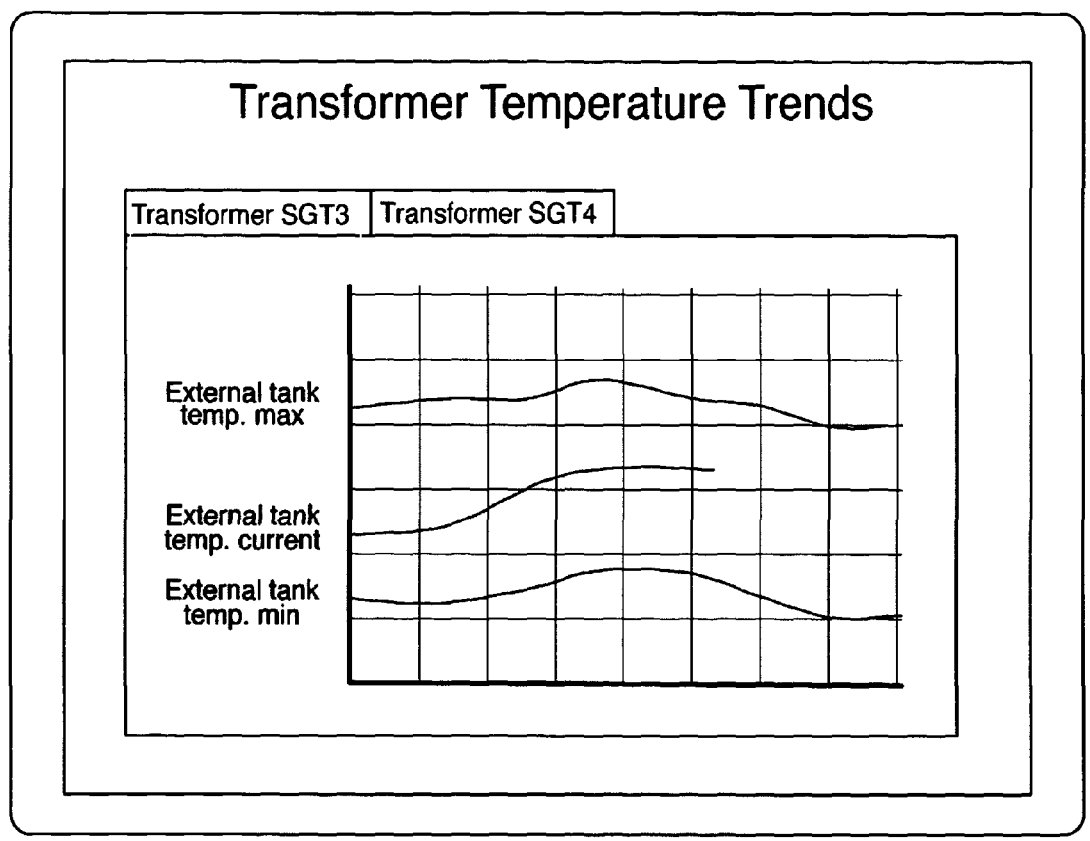
Figure 23:
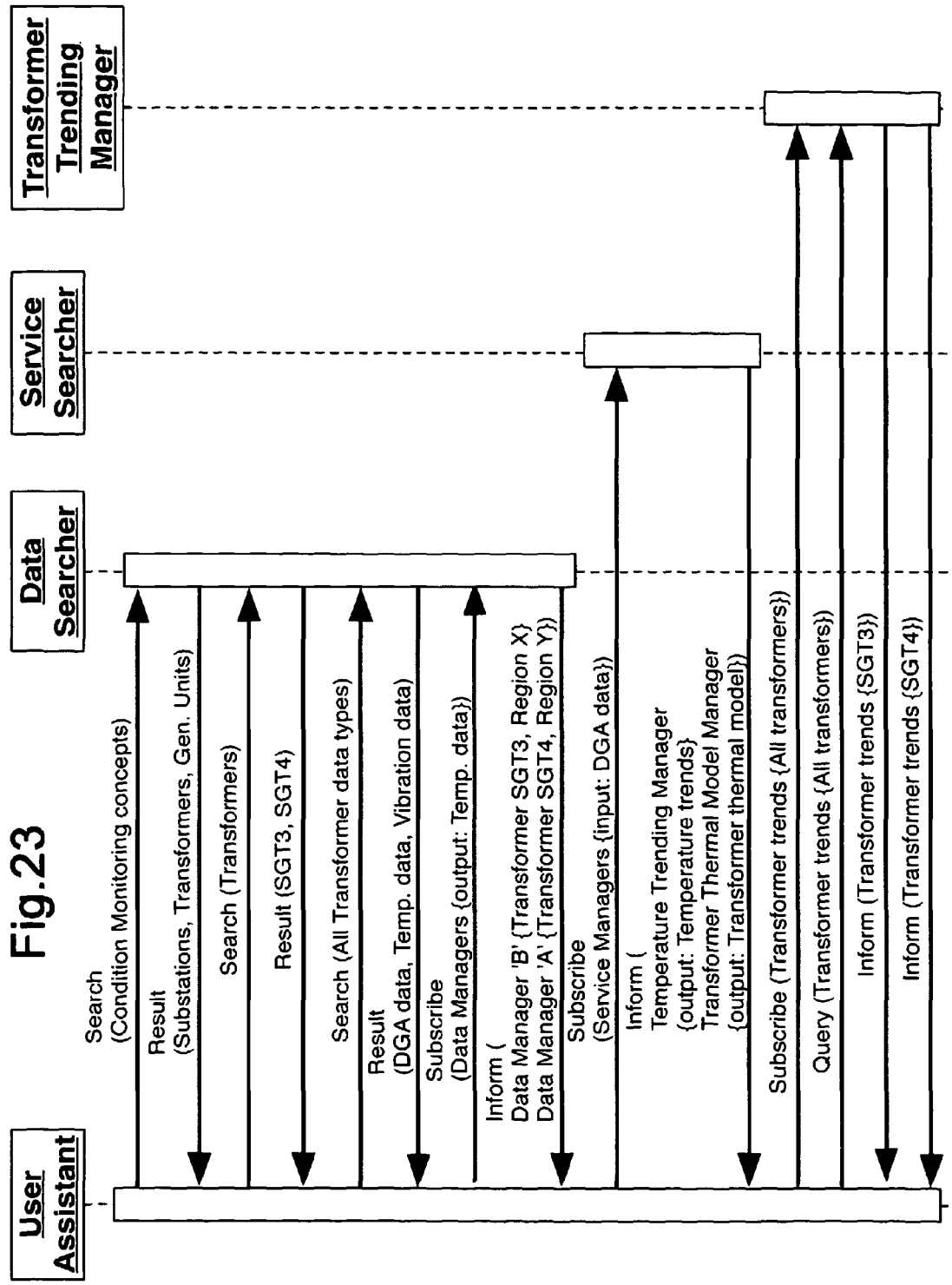
FIG. 23 is a flow diagram representing interactions caused by the specific selections shown in FIG. 22.

FIGS. 22 and 23 show the above process for a different user. This user is once more interested in transformer condition monitoring data, but in this case, they are looking for temperature measurements. The selection and related search processes can be followed in a similar fashion to that of FIGS. 19 and 20.

Figure 24:
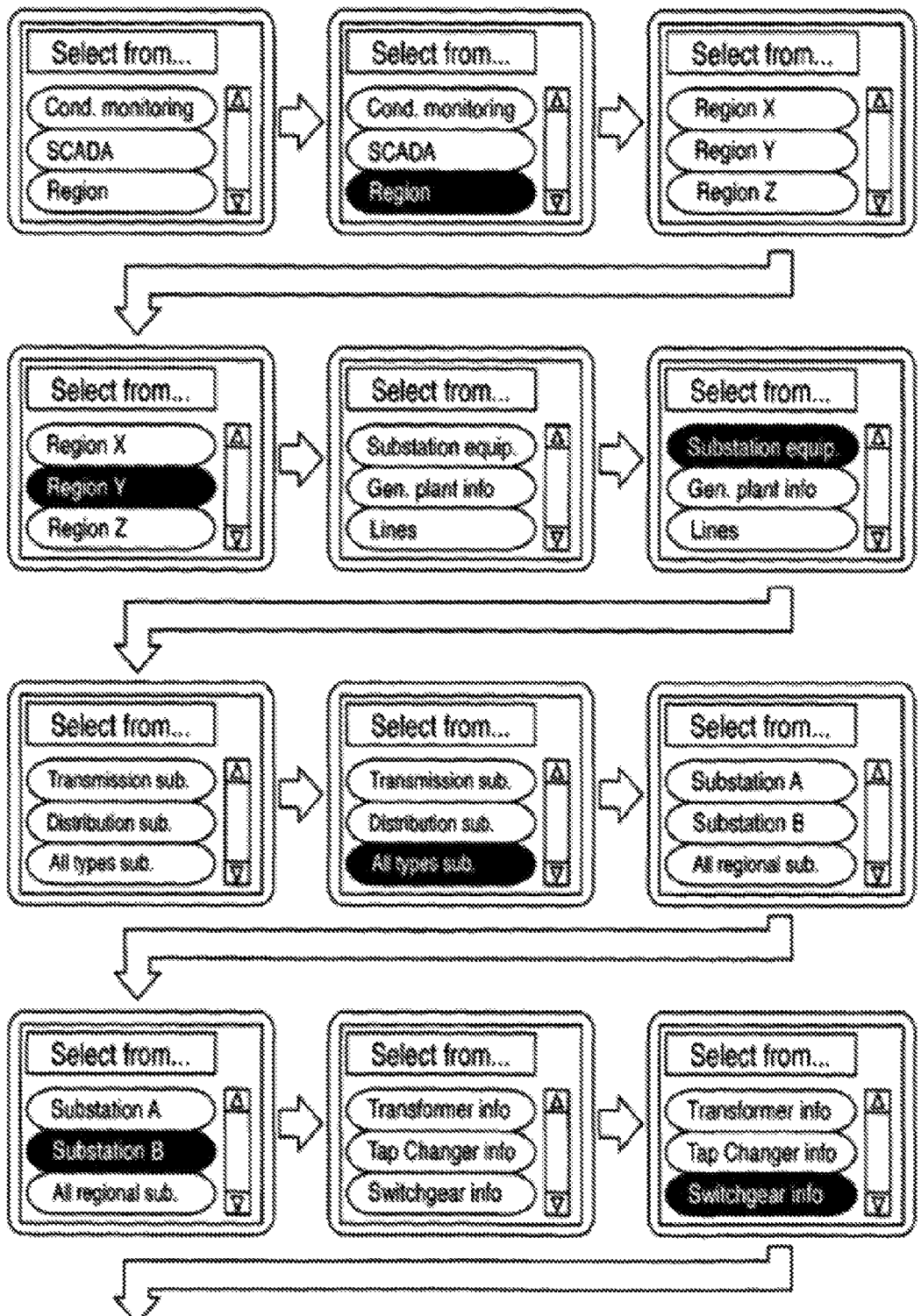
FIG. 24 is a representation of a plurality of user selection options for a power network that has multiple regions and types of different equipment.
Figure 24:
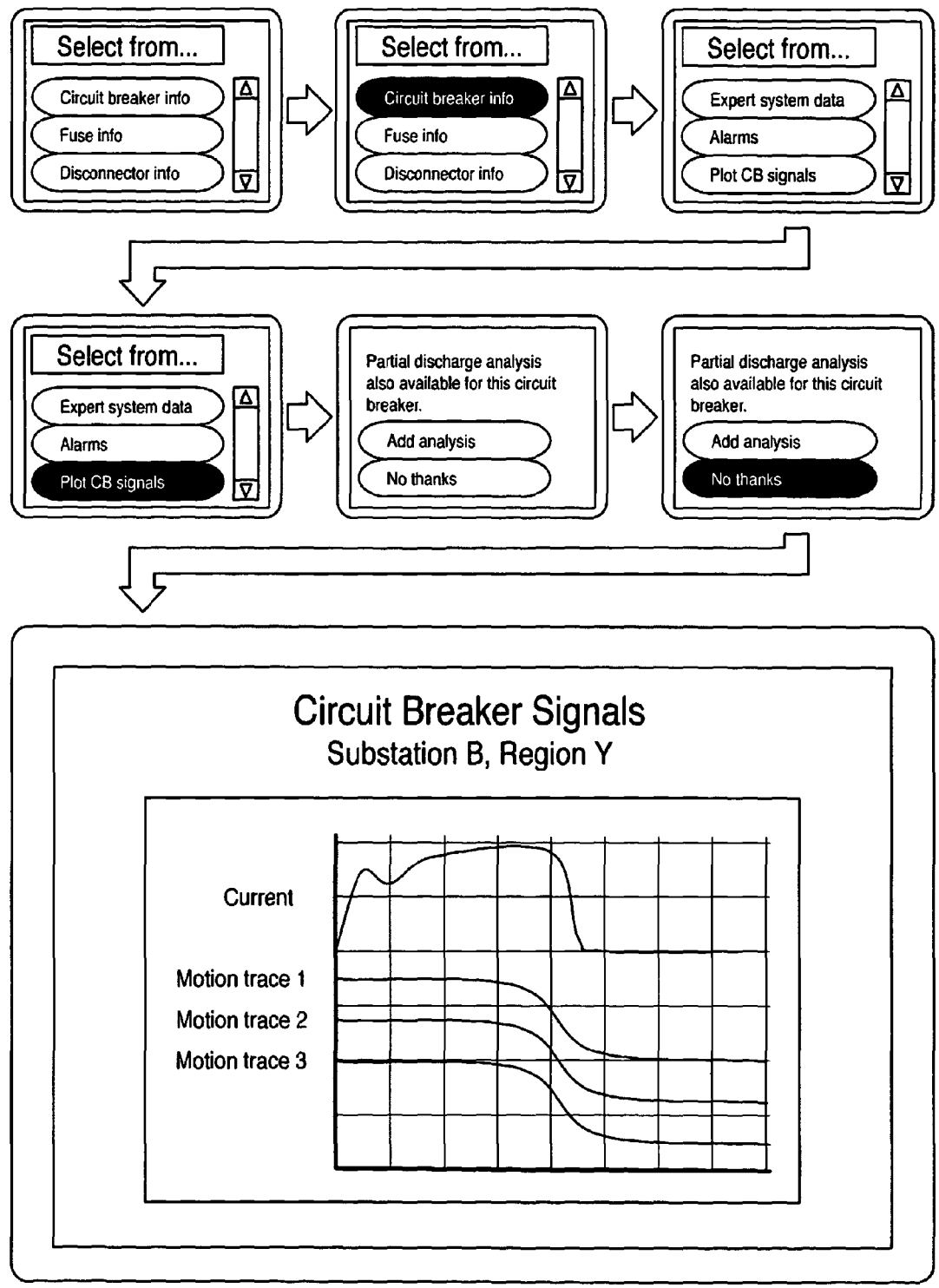

The user selection process can be extended to cover any number of different scenarios or arrangements. For example, FIG. 24 shows selection options for a system, capable of supplying data from many sources over many regions. Having asserted their desire to plot circuit breaker signals originating from Substation B within Region Y, they are informed that alongside the circuit breaker signals themselves, information concerning the partial discharge behaviour within the circuit breaker insulation is available. Although the user turns the information down in this instance, the additional information could help to explain the behaviour of circuit breakers and make clear any need for maintenance. The user assistant here helps to identify this relationship, which may otherwise have been ignored.

Figure 25:
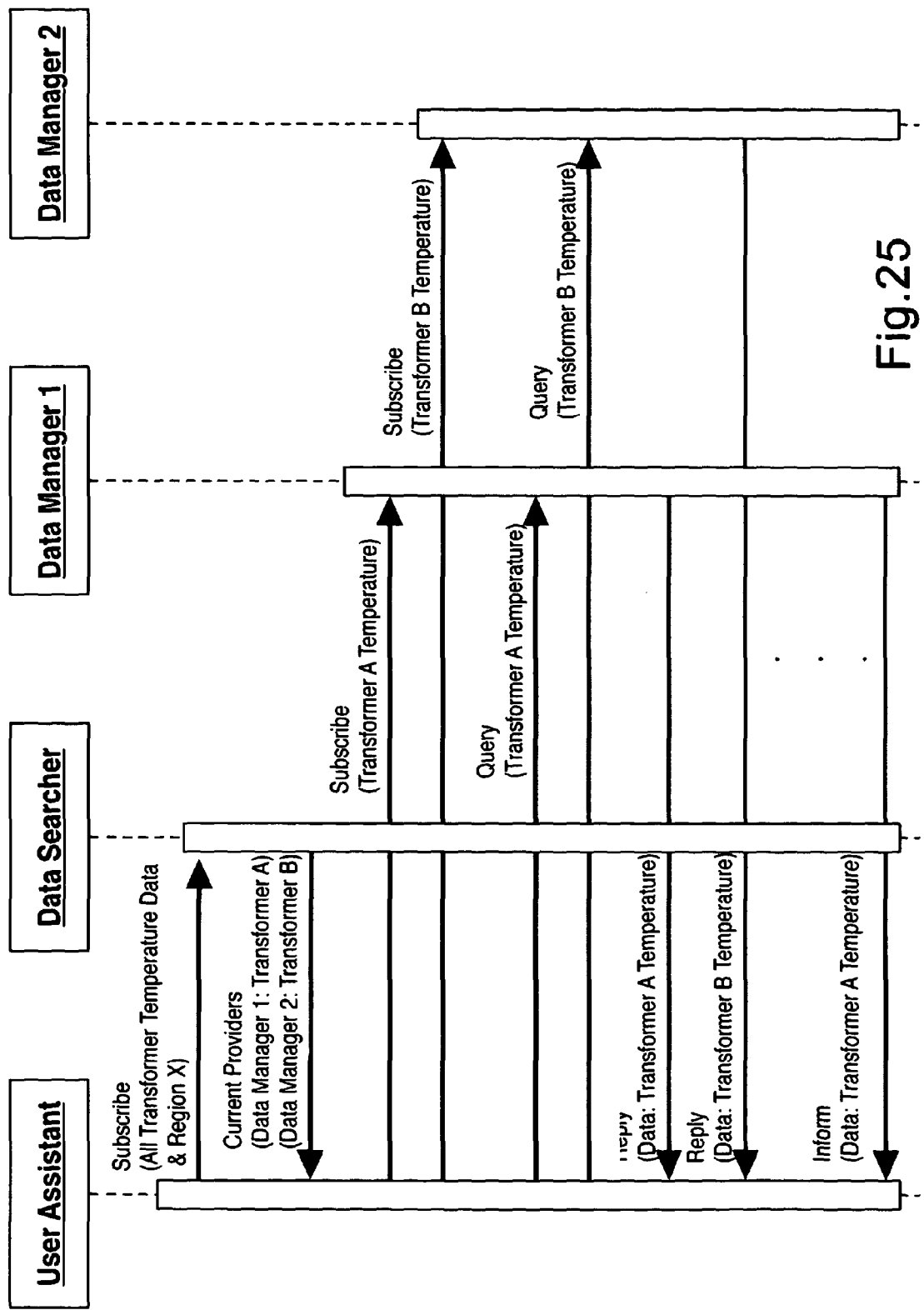
FIG. 25 is a flow diagram representing interactions caused by the specific selections shown in FIG. 24.
Figure 26:
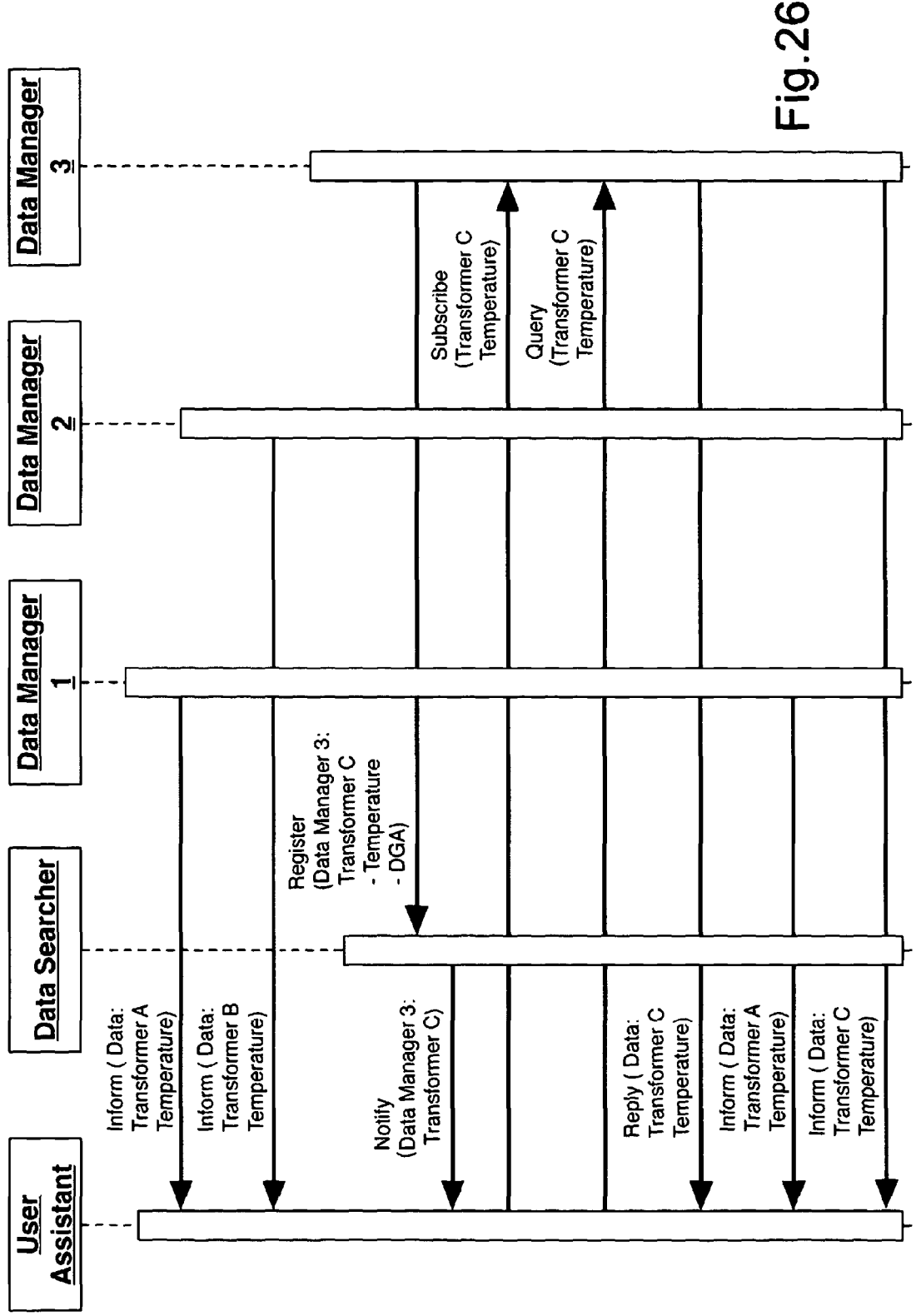
FIG. 26 is a flow diagram, which follows on from the flow diagram of FIG. 25 and represents the interactions that occur when a new data manager providing data of interest to a user joins the system.

FIGS. 25 and 26 show the effects of a new relevant agent joining the system. In FIG. 25, a user assistant subscribes to the Data Searcher to be informed of all data managers 18 capable of providing temperature data, sampled from transformers within Region X. The Data Searcher informs the user assistant that currently, two such data managers existing, Data Manager 1 and Data Manager 2. The user assistant then Subscribes to their data and Queries for any previously existing data as explained above. The data managers 18 first reply to the user assistant's query and following this, inform the user assistant of any changes to the data they hold.

The process of replying to queries and notifying the user of changes continues until a new data manager, Data Manager 3, joins the system, as shown in FIG. 26. This first registers with the Data Searcher, as explained previously, stating that it can provide both temperature and dissolved gas analysis data relating to transformer C. The Data Searcher knows that the user assistant is interested in transformer temperature data and so it notifies the user assistant of the change. The user assistant then subscribes to and queries the new data manager as before. At this point, the user is alerted through their display that a new data source has been found and the new data is displayed in the manner previously selected.

Equally, the system will inform users of new, relevant analysis services that become available. FIG. 28 illustrates a scenario whereby a user assistant subscribes to the Service Searcher for updates concerning dissolved gas analysis techniques. When a new tool is deployed within the system, its service manager 20 notifies the Service Searcher, which in turn notifies the user due to their subscription. The service manager 20 may also search the Data Searcher for sources of dissolved gas data, and subsequently subscribe to or query discovered data managers 18 for data in order to carry out its service. If the user indicates that they are interested in the new service, the user assistant contacts the service manager 20 directly to request the information that it can provide.

The above describes how ad-hoc functional teams may be dynamically configured to accommodate and utilise new service tools within a system. FIG. 28 illustrates the scenario whereby the service manager 20 is providing the service explicitly. FIG. 29 illustrates the scenario when this request causes the service manager 20 to spawn a separate service agent, which the user assistant may then interact with.

The condition monitoring system of the present invention has numerous advantages. It provides a platform that opens all data sources, regardless of type, allowing them to be accessed by analysis and interpretation modules, all of which may be accessed, interrogated and monitored through a single intuitive user interface. The content supplied through this interface is based on an individual profile, defined by the user themselves through their own interface with no reliance on pre-configuration by developers. The interface assists the user in creating this profile by probing for interests and searching within the overall system for information relevant to these. The profile therefore assists the user in tailoring their system to deliver the data, interpretation and visualisation that they require whilst filtering out irrelevant sources of information, which could lead to confusion or overload. In addition, the system proactively discovers new sources of data, analysis and interpretation as they emerge and, by intelligently evaluating individuals' interests, will provide users with personalised notifications of pertinent updates. This proactive functionality ensures that condition monitoring infrastructure may be extended over time, with the assurance that future investment will be exploited enterprise-wide and its value thereby maximised.

In addition, the system of the present invention allows comparison and corroboration of data from multiple sources. For instance, values from different data sources could be displayed on one screen, thereby allowing comparison of data. This display could, for example, be in the form of a graph of values against time so that exactly what happened (or was measured) when in relation to all factors is clear. As another example, it may be desirable to have intelligent techniques take care of data comparison or corroboration from multiple data sources. The type of data comparison that can be done in this case would depend on the service managers 20 within the overall system and what data types they are capable of integrating in their analysis.

A skilled person will appreciate that variations of the disclosed arrangements are possible without departing from the scope of the invention. For example, the system may be configured to allow users to add or remove interests, modify existing interests, display their data in a number of ways, e.g. graph plots, summary statistics, data tables, and be alerted when new and potentially interesting data or services become available. Also, the overall system may be distributed. For example, some agents may reside on-site, picking up data directly from sensors at the site that is being monitored, some may be running on central servers supplying database information or analysis functionality, and many may be running on users' personal machines. This provides some flexibility. For example, the service managers 20 may run on central or external servers. To make sure that these are not over-worked, there may be replication of service managers; perhaps one running for each service at each main location in the distributed network. Flexibility and redundancy is shown when some of these agents are not available for use (for instance, in the case of a server crash) and other agents providing the same functionality can be used instead.

Furthermore, although the system has been described with reference to a power system, it could equally be applied to any environment in which the condition of equipment has to be monitored. Accordingly the above description of the specific embodiment is made by way of example only and not for the purposes of limitation. It will be clear to the skilled person that minor modifications may be made without significant changes to the operation described.

The invention claimed is:

1. A computer based conditioning monitoring system configured to monitor the condition of physical hardware and/or at least one machine, the system comprising:
   one or more processing elements;
   a plurality of condition data sources configured to provide condition data relating to the machine and/or physical hardware to the system;
   a user interface for presenting the condition data to a user of the system; and
   a conditioning monitoring platform operable to communicate, via the one or more processing elements, with the plurality of condition data sources and the user interface, the conditioning monitoring platform comprising:
      a plurality of user assistants, one for each user, each user assistant being configured to proactively and autonomously:
         determine condition data of interest to a user; and
         build and store a user profile based on the condition data of interest;
      a plurality of data managers, at least one associated with each condition data source, each data manager being configured to proactively and autonomously:
         provide access to its associated data source;
         identify, via the one or more processing elements, when new data is added to its associated data source; and communicate the data, via the one or more processing elements, to one or more of the plurality of user assistants that has a user profile that indicates the data is of interest, wherein when a new condition data source becomes available a new associated data manager is added;

a plurality of service managers operable to access, via the one or more processing elements, data made available by the data managers, each service manager being operable to proactively and autonomously provide an analysis of data using one or more data analysis functions, each service manager having knowledge of the data required to perform its analysis function and being configured to communicate at least one data analysis to the one or more of the plurality of user assistants that have that data in their user profile, wherein:

at least one of the data managers or the service managers dynamically self-organize themselves into functional groupings to provide a customized analysis of at least one of the condition data or the customized condition data, the self-organization comprising:

the system pro-actively and autonomously identifying at least one of:

at least one data manager or condition data source for which the associated condition data is of interest or which supplies condition data required for at least one of the service managers to perform its analysis function; or at least one service manager that performs a required data analysis;

the service managers pro-actively and autonomously seeking, or being automatically informed of, the condition data required for the respective service manager to perform its analysis function and making available results of the data analysis performed by the service manager using the condition data provided by the identified data manager or condition data source; and the user assistants pro-actively and autonomously seeking, or being automatically informed of, one or more of the identified condition data source(s), data manager(s) or service manager(s) based on the user profile, and pro-actively and autonomously accessing or being provided with the condition data and/or results of the data analysis therefrom to generate a customized presentation of condition data to the user.

2. A computer based conditioning monitoring system as claimed in claim 1, wherein the system is configured to allow the addition of one or more new functions and an associated proactively and autonomously configured service manager.

3. A computer based conditioning monitoring system as claimed in claim 1, wherein the data sources store sensed condition information from at least one condition sensor and any added condition sensor.

4. A computer based conditioning monitoring system as claimed in claim 1, wherein the plurality of data sources is associated with different sites or locations.

5. A computer based conditioning monitoring system as claimed in claim 1, wherein the user assistant is configured to determine data of interest to a user by presenting to the user a plurality of user selectable options based on available data, and receive one or more user selections.

6. A computer based conditioning monitoring system as claimed in claim 5, the system being configured to present a plurality of high level options to a user, each option being associated with a plurality of related, more specific options, wherein on selection of one of the high level options the other more specific options are presented.

7. A computer based conditioning monitoring system as claimed in claim 6, wherein the plurality of more specific options are related to the associated higher level option based on an "is-a" relationship.

8. A computer based conditioning monitoring system as claimed in claim 1, the system being configured to change the user profile.

9. A computer based conditioning monitoring system as claimed in claim 8, wherein the user profile is up-dated in response to receipt of information on a new user interest.

10. A computer based conditioning monitoring system as claimed in claim 1, the system being configured to maintain a register of the type of information available.

11. A computer based conditioning monitoring system as claimed in claim 10, the system being configured to cause the register to be up-dated in the event that further information becomes available.

12. A computer based conditioning monitoring system as claimed in claim 1, the system further comprising a user translator for translating information received from the user into a form interpretable by the computer based system and translating information received from the computer based system into a form interpretable by the user.

13. A computer based conditioning monitoring system as claimed in claim 1, the system further comprising a data translator for translating information received from the or each data source into a form interpretable by the computer based system.

14. A computer based conditioning monitoring system as claimed in claim 13, wherein the data translator is configured to translate information received from the computer based system into a form interpretable by the or each data source.

15. A computer based conditioning monitoring system as claimed in claim 1, wherein the system is distributed.

16. A computer based conditioning monitoring system as claimed in claim 1, wherein each of the data managers, the service managers and the user assistants is implemented using one or more software agents.

17. A computer based conditioning monitoring system as claimed in claim 1, wherein the at least one condition data source comprises condition data, including at least one of: sensor data captured from sensors in the system being monitored and data from manual inspection.

18. A computer based conditioning monitoring system as claimed in claim 1, wherein the proactively and autonomously configured plurality of user assistants, data managers, and service managers are each configured to operate without any input from the user of the system.

* * * * *